United States Patent
Weightman et al.

(10) Patent No.: US 8,198,820 B2
(45) Date of Patent: Jun. 12, 2012

(54) TWO-WIRE DIMMER CIRCUIT FOR A SCREW-IN COMPACT FLUORESCENT LAMP

(75) Inventors: Russell Weightman, Abington, PA (US); Mark S. Taipale, Harleysville, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 13/313,307

(22) Filed: Dec. 7, 2011

(65) Prior Publication Data

US 2012/0074853 A1  Mar. 29, 2012

Related U.S. Application Data

(63) Continuation of application No. 12/971,412, filed on Dec. 17, 2010, which is a continuation of application No. 11/932,130, filed on Oct. 31, 2007, now Pat. No. 7,868,561.

(51) Int. Cl.
 *H05B 41/36* (2006.01)
(52) U.S. Cl. ............ 315/226; 315/209 R; 315/DIG. 4
(58) Field of Classification Search .......... 315/137, 315/146, 194, 195, 209 R, 210, 216, 217, 315/224, 225, 226, 246, 247, 250, 287, 291, 315/302, 307, 308–311, 360, 362
See application file for complete search history.

(56) References Cited

U.S. PATENT DOCUMENTS

| | | | |
|---|---|---|---|
| 4,563,592 A | 1/1986 | Yuhasz | |
| 4,954,768 A | 9/1990 | Luchaco | |
| 5,422,547 A | 6/1995 | Brownell | |
| 5,430,356 A | 7/1995 | Ference | |
| 6,310,439 B1 | 10/2001 | Jacoby | |
| 6,646,843 B1 | 11/2003 | Newman, Jr. et al. | |
| 7,190,124 B2 | 3/2007 | Kumar et al. | |
| 7,190,125 B2 | 3/2007 | McDonough et al. | |
| 7,687,940 B2 | 3/2010 | Mosebrook et al. | |
| 2007/0285027 A1 | 12/2007 | Gehman et al. | |

(Continued)

FOREIGN PATENT DOCUMENTS

| WO | WO 95/10928 | 4/1995 |
|---|---|---|
| WO | WO 98/46054 | 10/1998 |

OTHER PUBLICATIONS

International Preliminary Report on Patentability dated Aug. 2, 2011 issued in corresponding PCT International Application No. PCT/US08/0119533.

(Continued)

*Primary Examiner* — Douglas W Owens
*Assistant Examiner* — Jianzi Chen
(74) *Attorney, Agent, or Firm* — Ostrolenk Faber LLP

(57) ABSTRACT

A dimmer switch for controlling the intensity of a dimmable screw-in compact fluorescent lamp provides smooth dimming of the fluorescent lamp and prevents flickering of the lamp due to multiple re-strikes. The dimmer switch prevents multiple re-strikes by avoiding multiple firings of a controllably conductive switching device of the dimmer circuit by limiting the high-end light intensity of the fluorescent lamp. Specifically, the dimmer switch limits the length of a conduction interval of the controllably conductive switching device to less than approximately 75% of each half-cycle. The dimmer switch may include a user-accessible adjustment actuator for changing the dimmer switch between an incandescent operating mode and a screw-in compact fluorescent mode. The dimmer switch may also be operable to automatically change the dimmer switch between the incandescent operating mode and the screw-in compact fluorescent mode by detecting the occurrence of the multiple firings of the controllably conductive switching device.

37 Claims, 21 Drawing Sheets

U.S. PATENT DOCUMENTS

2009/0039854 A1 2/2009 Blakeley et al.
2009/0256483 A1 10/2009 Gehman et al.

OTHER PUBLICATIONS

Description of MAESTRO® Dimmer Model MALV-600 product of assignee Lutron Electronics Co. Inc. shown at p. 62 of Lutron's 2006 catalog. The product employs a fault detection technique which is described in the attached 8 page description and circuit diagram. Applicant will gladly answer any question the Examiner cares to raise regarding the details of the circuit diagram of the device or the attached description of its operation.

Skylark Variable Fan Speed Instruction Sheet, Sep. 2001 (033039c) (Fan/Light Controls).
Ariadni Diva Fluorescent Instruction Sheet, Oct. 2003 (031159c).
Diva Controls Specification Submittal, Mar. 2003.
Diva Fluorescent Schematic, Feb. 1999 (501759).
Nova T* Incandescent Low Voltage Dimmers Installation Instructions, May 1986 (030142).
Nova T* Incandescent/Halogen Dimmer NT-2000 Installation Instruction, Sep. 1999 (030619).
Nova T* NT-2000 Schematic, Apr. 1999 (501766).
Nova Fluorescent Controls Installation Instructions, May 2007 (031176).
Nova Controls Specification Submittal 2001 (360393).
Nova T* NTF Schematic, 1999 (501767).

TWO-WIRE DIMMER CIRCUIT FOR A SCREW-IN COMPACT FLUORESCENT LAMP

CROSS-REFERENCE TO RELATED APPLICATION

This application is a continuation of U.S. patent application Ser. No. 12/971,412, filed Dec. 17, 2010, by Russell Weightman and Mark S. Taipale entitled TWO-WIRE DIMMER CIRCUIT FOR A SCREW-IN COMPACT FLUORESCENT LAMP, which is a continuation of U.S. patent application Ser. No. 11/932,130, filed Oct. 31, 2007, by Russell Weightman and Mark S. Taipale entitled TWO-WIRE DIMMER CIRCUIT FOR A SCREW-IN COMPACT FLUORESCENT LAMP, now U.S. Pat. No. 7,868,561, issued Jan. 11, 2011 the entire contents of which is hereby incorporated by reference.

BACKGROUND OF THE INVENTION

1. Field of the Invention

The present invention relates to load control devices for controlling the amount of power delivered to an electrical load from a power source. More specifically, the present invention relates to a two-wire dimmer circuit for controlling the intensity of a dimmable screw-in compact fluorescent lamp.

2. Description of the Related Art

A conventional two-wire dimmer circuit 10, as shown in FIG. 1, has two terminals: a "hot" terminal H for connection to an alternating-current (AC) power source 12 (e.g., 120 $V_{AC}$ @ 60 Hz) and a "dimmed hot" terminal DH for connection to a lighting load 14, such as an incandescent lamp. The dimmer circuit 10 typically uses a bidirectional semiconductor switch (not shown), such as, for example, a triac, to control the current delivered to the lighting load 14, and thus to control the state (i.e., on or off) and the intensity of the lighting load between a high-end intensity setting (i.e., a maximum value) and a low-end intensity setting (i.e., a minimum value). The bidirectional semiconductor switch is typically coupled between the hot terminal H and the dimmed hot terminal DH of the dimmer circuit 10, and thus, in series between the AC power source 12 and the lighting load 14. The bidirectional semiconductor switch is controlled to be conductive and non-conductive each half-cycle to control the amount of power delivered to the lighting load 14.

FIG. 2A is a simplified diagram of a hot voltage $V_H$ received from the AC power source 12 (as shown by the dotted line) and a dimmed-hot voltage $V_{DH}$ provided to the lighting load 14 when the dimmer circuit 10 is controlling the intensity of the lighting load to the high-end intensity setting. FIG. 2B is a simplified diagram of the hot voltage $V_H$ and the dimmed-hot voltage $V_{DH}$ when the dimmer circuit 10 is controlling the intensity of the lighting load 14 to the low-end intensity setting. Using a forward phase control (or "phase-cut") dimming technique, the dimmer circuit 10 controls the semiconductor switch to be non-conductive at the beginning of each half-cycle of the AC power source 12 during an off time $T_{OFF}$. Then, the dimmer circuit 10 renders the semiconductor switch conductive during a conductive interval $T_{CON}$ (i.e., an on time) after the off time $T_{OFF}$. The dimmer circuit 10 maintains the semiconductor switch conductive during the conduction interval $T_{CON}$ until the end of the half-cycle. The intensity of the lighting load 14 is dependent upon how long the semiconductor switch is conductive each half-cycle. At the high-end intensity setting, the off time $T_{OFF}$ is approximately 1.4 msec, such that the conduction interval $T_{CON}$ is approximately 6.9 msec (assuming that each half-cycle is approximately 8.3 msec long on a 120-$V_{AC}$, 60-Hz AC power source 12). At the low-end intensity setting, the off time $T_{OFF}$ is approximately 6.8 msec, such that the conduction interval $T_{CON}$ is approximately 1.5 msec. Forward phase control dimming is typically used to control incandescent and magnetic low-voltage (MLV) lighting loads.

Gas discharge lamps, such as fluorescent lamps, must be driven by a ballast in order to illuminate properly. FIG. 3 is a simplified block diagram of a lighting system including a fluorescent Tu-Wire® dimmer circuit 20 for driving a two-wire fluorescent load 24. The fluorescent load 24 only requires two connections, i.e., to the dimmed hot terminal DH of the fluorescent Tu-Wire® dimmer circuit 20 and to the neutral of the AC power source 12. The fluorescent load 24 includes a two-wire ballast 26 (e.g., a Tu-Wire® electrical dimming ballast, part number 2W-T418-120-2-S, manufactured by Lutron Electronics Co., Inc., or a Mark X® electrical dimming ballast manufactured by Advance Transformer Co.) and a fluorescent lamp 28. Because of the size of the ballast 26, the ballast is typically located in a junction box external to the lighting fixture of the fluorescent lamp 28. The ballast 26 includes a full-wave rectifier for receiving the dimmed-hot voltage from the dimmer circuit 20, and an active front-end, such as a boost converter, for generating a substantially direct-current (DC) bus voltage. A back-end of the ballast 26 converts the DC bus voltage to a high-frequency AC voltage for driving the fluorescent lamp 28.

The Tu-Wire® dimmer circuit 20 is specifically designed to drive the fluorescent load 24 and may comprise part number NTFTU-5A or part number SFTU-5A3P, both manufactured by Lutron Electronics Co., Inc. The ballast 26 controls the intensity of the lamp 28 in response to the amount of time that the semiconductor switch of the dimmer circuit 20 is conductive each half-cycle. The ballast 26 requires a minimum input voltage greater than the minimum input voltage of an incandescent lamp or an MLV load, so that the low-end intensity setting of the Tu-Wire® dimmer circuit 20 is higher than the low-end intensity setting of the dimmer circuit 10 of FIG. 1 and the lamp does not drop out (i.e., the lamp arc is not extinguished) if the length of the conductive interval $T_{CON}$ is controlled to be too short. Further, because the ballast 26 does not draw as much current as an incandescent lamp or an MLV load, the Tu-Wire® dimmer circuit 20 includes a bidirectional semiconductor switch having a lower holding current rating than the triac of the incandescent dimmer circuit 10 of FIG. 1. Ideally, the triac of the Tu-Wire® dimmer circuit 20 has a holding current rating of approximately 15 mA, where the triac of the incandescent dimmer circuit 10 has a holding current rating of approximately 50 mA.

FIG. 4A is a simplified diagram of the hot voltage $V_H$ and the dimmed-hot voltage $V_{DH}$ provided to the fluorescent load 24 when the Tu-Wire® dimmer circuit 20 is controlling the intensity of the fluorescent lamp 28 to the high-end intensity setting. FIG. 4B is a simplified diagram of the hot voltage $V_H$ and the dimmed-hot voltage $V_{DH}$ when the Tu-Wire® dimmer circuit 20 is controlling the intensity of the fluorescent lamp 28 to the low-end intensity setting. As shown in FIG. 4A, the high-end intensity setting is the same as the high-end intensity setting of the incandescent dimmer circuit 10 of FIG. 1 (i.e., the off time $T_{OFF}$ is approximately 1.4 msec). Decreasing the high-end intensity setting of the Tu-Wire® dimmer circuit 20 would unnecessarily limit the maximum light output of the fluorescent lamp 28. However, the low-end intensity setting of the Tu-Wire® dimmer circuit 20 is higher than that provided by the dimmer circuit 10 of FIG. 1. Specifically, the Tu-Wire® dimmer circuit 20 provides a maximum off time $T_{OFF}$ of approximately 5.6 msec, such that the semiconductor switch is conductive for approximately 2.75 msec each half-cycle, i.e., at least approximately 33% of each half-cycle. The maximum off time $T_{OFF}$ may range from approximately 5.4 to 5.7 milliseconds (i.e., approximately 31%-35% of each half-cycle) resulting in the dimmed hot voltage $V_{DH}$ having a magnitude of approximately 50 to 58 $V_{RMS}$ when the dimmer circuit 20 is controlling the intensity of the fluorescent lamp 28 to the low-end intensity setting.

Recently, compact fluorescent lamps that comprise screw-in bases for attachment to standard Edison sockets have become popular replacements for standard screw-in incandescent bulbs. These screw-in compact fluorescent lamps consume less power than incandescent bulbs and provide an easy solution for reducing the power consumption of a lighting system. The screw-in compact fluorescent lamps have an integral ballast circuit housed in the base of the lamp and are often made to look similar to incandescent lamps, such as BR30 lamps and PAR38 lamps. Since the screw-in compact fluorescent lamps have different operational characteristics than incandescent lamps, the dimmer circuits used for the screw-in incandescent lamps (as shown in FIG. 1) are not able to appropriately control the screw-in compact fluorescent lamps.

Particularly, problems often arise when the Tu-Wire® dimmer circuit 20 attempts to control the intensity of a dimmable screw-in compact fluorescent lamp to the high-end intensity setting. FIG. 5 is a simplified block diagram of the Tu-Wire® dimmer circuit 20 controlling a dimmable screw-in compact fluorescent lamp 34 (e.g., a Philips® Marathon® dimmable screw-in compact fluorescent lamp), which includes a ballast circuit 36, located in a base portion, and a coil lamp tube 38. FIG. 6 is a simplified diagram of the hot voltage $V_H$ and the dimmed-hot voltage $V_{DH}$ provided to the screw-in fluorescent lamp 34 when the Tu-Wire® dimmer circuit 20 is attempting to control the intensity of the fluorescent lamp to the high-end intensity setting. When the dimmer circuit 20 attempts to fire the triac near the beginning of the half-cycle when the hot voltage $V_H$ is still relatively small, the screw-in fluorescent lamp 34 may not draw enough current to exceed the latching current rating and/or the holding current rating of the triac in the Tu-Wire® dimmer circuit 20. Therefore, the Tu-Wire® dimmer circuit 20 attempts to fire the semiconductor switch multiple times (as shown by multiple voltage peaks 40 in FIG. 6) until the semiconductor switch is finally rendered conductive. These multiple firings of the semiconductor switch can cause flicker in the light output, audible noise, increased electro-magnetic interference (EMI), and excessive stress on the components of the dimmer circuit 20 and the ballast circuit 36 of the screw-in fluorescent lamp. As a result, the dimming of compact fluorescent lamps has been commercially unsuccessful thus reducing the possibility of further energy savings with these desirable replacements for energy-wasting incandescent lamps.

Therefore, there is a need for a dimmer circuit that provides smooth dimming of a screw-in compact fluorescent lamp and avoids the issues of multiple firings of the semiconductor switch.

SUMMARY OF THE INVENTION

According to the present invention, a two-wire dimmer control circuit for a dimmable screw-in compact fluorescent lamp load comprises a controllably conductive switching device, a phase-cut AC drive circuit, and a high-end intensity regulation circuit. The controllably conductive switching device has a control electrode and is adapted to be coupled in series electrical connection between an AC power source and a ballast circuit of the screw-in fluorescent lamp load. The phase-cut AC drive circuit is connected to the control electrode of the controllably conductive switching device for rendering the controllably conductive switching device conductive for a conductive interval each half-cycle of the AC power source. The phase-cut AC drive circuit is operable to control the length of the conduction interval of the controllably conductive switching device each half-cycle. The high-end intensity regulation circuit limits the length of the conduction interval of the controllably conductive switching device to less than approximately 75% of each half-cycle, thereby preventing multiple firings of the controllably conductive switching device.

The present invention further provides a phase-cut circuit for controlling the amount of power delivered from an AC power source to an incandescent lamp. The phase-cut circuit is modified to drive a fluorescent ballast for a fluorescent lamp. The phase-cut circuit includes a triac that has a lower holding current than that used for the incandescent lamp, and provides a reduced high end as compared to that used for the incandescent lamp.

According to another embodiment of the present invention, a two-wire dimmer circuit for a fluorescent lamp load comprises a bidirectional semiconductor switch, a timing circuit, and a trigger circuit for rendering the bidirectional semiconductor switch conductive for a conduction interval each half-cycle, where the improvement comprises the timing circuit being adapted to limit the conduction interval to less than approximately 75% of each half-cycle. The bidirectional semiconductor switch is adapted to be coupled in series electrical connection between the AC power source and a ballast circuit of the fluorescent lamp for controlling the amount of power delivered to the ballast circuit. The timing circuit is operatively coupled in parallel electrical connection with the bidirectional semiconductor switch, and has an output for generating a timing voltage representative of a desired intensity of the fluorescent lamp. The trigger circuit is operatively coupled between the output of the timing circuit and a control input of the bidirectional semiconductor switch. The trigger circuit is operable to render the bidirectional semiconductor switch conductive in response to the timing voltage, such that the bidirectional semiconductor switch is conductive for the conduction interval each half-cycle.

In addition, the present invention provides a two-wire dimmer control circuit for a fluorescent lamp load comprising means for conducting a load current from an AC power source to a ballast circuit of the fluorescent lamp load for a conduction interval each half-cycle of the AC power source, and means for controlling the length of the conduction interval each half-cycle. The improvement comprises means for limiting the length of the conduction interval to less than approximately 75% of each half-cycle.

The present invention further provides a method of controlling a fluorescent lamp load including a ballast circuit. The method comprising the steps of: (1) conducting a load current from an AC power source to the ballast circuit for a conduction interval each half-cycle of the AC power source; (2) controlling the length of the conduction interval each half-cycle; and (3) limiting the length of the conduction interval to less than approximately 75% of each half-cycle.

According to another aspect of the present invention, a dimmer switch is adapted to be coupled between an AC power source generating an AC line voltage and a lighting load for controlling the intensity of the lighting load between a high-end intensity setting and a low-end intensity setting. The dimmer switch comprises a controllably conductive switching device adapted to be coupled in series electrical connection between the AC power source and the lighting load for controlling the amount of power delivered to the lighting load, a drive circuit coupled to a control input of the controllably conductive switching device for controlling the controllably conductive switching device to be conductive for a conduction interval each half-cycle of the AC power source, and a user interface operable to receive a user input for changing the dimmer switch between first and second operating modes. The drive circuit is operable to adjust the high-end intensity setting to a first high-end intensity setting value and the low-end intensity setting to a first low-end intensity setting value in the first operating mode, and to adjust the high-end intensity setting to a second high-end intensity setting value and the low-end intensity setting to a second low-end intensity setting value in the second operating mode. Preferably, the second high-end intensity setting value is less than the first high-end intensity setting value, and the second low-end intensity setting value is greater than the first low-end intensity setting value.

According to another embodiment of the present invention, a dimmer switch for controlling the intensity of a lighting load between a high-end intensity setting and a low-end intensity setting comprises a user-accessible adjustment actuator for changing the dimmer switch between first and second operating modes. The high-end intensity setting is adjusted to a first high-end intensity setting value and the low-end intensity setting is adjusted to a first low-end intensity setting value in the first operating mode, and the high-end intensity setting is adjusted to a second high-end intensity setting value and the low-end intensity setting is adjusted to a second low-end intensity setting value in the second operating mode.

According to another embodiment of the present invention, a dimmer switch for controlling the intensity of a lighting load between a high-end intensity setting and a low-end intensity setting comprises a controllably conductive switching device, a controller, and a user interface. The controllably conductive switching device is adapted to be coupled in series electrical connection between an AC power source and the lighting load for controlling the amount of power delivered to the lighting load. The controller is coupled to a control input of the controllably conductive switching device for controlling the controllably conductive switching device to be conductive for a conduction interval each half-cycle of the AC power source. The controller is operable to change the dimmer switch between first and second operating modes in response a user input received by the user interface. The high-end intensity setting is adjusted to a first high-end intensity setting value and the low-end intensity setting is adjusted to a first low-end intensity setting value in the first operating mode, and the high-end intensity setting is adjusted to a second high-end intensity setting value and the low-end intensity setting is adjusted to a second low-end intensity setting value in the second operating mode.

The present invention further provides a drive circuit for a controllably conductive switching device of a dimmer switch for controlling the intensity of a lighting load between a high-end intensity setting and a low-end intensity setting. The drive circuit comprises a potentiometer for providing a variable resistance, a firing capacitor coupled to an output of the potentiometer for generating a timing voltage, and a mechanical switch for changing the dimmer switch between first and second operating modes. The firing capacitor is adapted to charge through the potentiometer such that the timing voltage is responsive to the variable resistance of the potentiometer. The high-end intensity setting is adjusted to a first high-end intensity setting value and the low-end intensity setting is adjusted to a first low-end intensity setting value in the first operating mode, and the high-end intensity setting is adjusted to a second high-end intensity setting value and the low-end intensity setting is adjusted to a second low-end intensity setting value in the second operating mode.

In addition, the present invention provides a dimmer switch comprising a controllably conductive switching device and a user interface, wherein the improvement to the dimmer switch comprises a drive circuit responsive to the user interface to change the dimmer switch between first and second operating modes. The drive circuit is operable to adjust a high-end intensity setting of the dimmer switch to a first high-end intensity setting value and a low-end intensity setting of the dimmer switch to a first low-end intensity setting value in the first operating mode. The drive circuit is further operable to adjust the high-end intensity setting to a second high-end intensity setting value and the low-end intensity setting to a second low-end intensity setting value in the second operating mode.

According to another aspect of the present invention, a dimmer switch for controlling the intensity of a lighting load between a high-end intensity setting and a low-end intensity setting is operable to automatically adjust between first and second operating modes. The dimmer switch comprises a controllably conductive switching device adapted to be coupled in series electrical connection between an AC line voltage and the lighting load for controlling the amount of power delivered to the lighting load. The dimmer switch further comprises a controller operable to drive the controllably conductive switching device to change the controllably conductive switching device from a non-conductive state to a conductive state each half-cycle of the AC power source. The controller is operable to render the controllably conductive switching device conductive after a minimum off time following a zero-crossing of the AC line voltage, and to subsequently determine whether the controllably conductive switching device is conducting a load current to the lighting load. The controller is further operable to adjust the dimmer switch to one of the first operating mode and the second operating mode in response to whether the controllably conductive switching device is conducting current to the load, to adjust the high-end intensity setting to a first high-end intensity setting value and the low-end intensity setting to a first low-end intensity setting value in the first operating mode, and to adjust the high-end intensity setting to a second high-end intensity setting value and the low-end intensity setting to a second low-end intensity setting value in the second operating mode. Preferably, the second high-end intensity setting value is less than the first high-end intensity setting value, and the second low-end intensity setting value is greater than the first low-end intensity setting value.

According to another embodiment of the present invention, a dimmer switch comprises a first load terminal adapted to be coupled to an AC power source, a second load terminal adapted to be coupled to a lighting load, a controllably conductive switching device adapted to be coupled in series electrical connection between the first and second load terminals for controlling the amount of power delivered to the lighting load, a controller coupled to a control input of the controllably conductive switching device for controlling the controllably conductive switching device to be conductive for a conduction interval each half-cycle of the AC power source; and a sense circuit coupled such that the sense circuit is operable to sense an electrical characteristic of the second load terminal. The sense circuit is adapted to provide a control signal representative of the electrical characteristic to the controller, such that the controller is operable to change the dimmer switch between first and second operating modes in response to the control signal from the sense circuit. Accordingly, a high-end intensity setting of the dimmer switch is adjusted to a first high-end intensity setting value and a low-end intensity setting is adjusted to a first low-end intensity setting value in the first operating mode, while the high-end intensity setting is adjusted to a second high-end intensity setting value and the low-end intensity setting is adjusted to a second low-end intensity setting value in the second operating mode.

According to another embodiment of the present invention, a dimmer switch comprises a first load terminal adapted to be coupled to an AC power source, a second load terminal adapted to be coupled to a lighting load, a controllably conductive switching device, and a controller operable to automatically adjust the dimmer switch to one of a first operating mode and a second operating mode. The controllably conductive device is adapted to be coupled in series electrical connection between the first and second load terminals for controlling the amount of power delivered to the lighting load, and the controller is coupled to a control input of the controllably conductive switching device for controlling the controllably conductive switching device to be conductive for a conduction interval each half-cycle of the AC power source. A high-end intensity setting of the dimmer switch is adjusted to a first high-end intensity setting value and a low-end intensity setting is adjusted to a first low-end intensity setting value in the first operating mode, while the high-end intensity setting is adjusted to a second high-end intensity setting value and the low-end intensity setting is adjusted to a second low-end intensity setting value in the second operating mode.

The present invention further provides a method of controlling a dimmer switch adapted to be coupled between an AC power source and a lighting load, where the dimmer switch adapted to control the intensity of the lighting load between a high-end intensity setting and a low-end intensity setting. The method comprises the steps of: (1) conducting a load current from the AC power source to the lighting load for a conduction interval each half-cycle of the AC power source; (2) controlling the length of the conduction interval each half-cycle; (3) automatically changing the dimmer switch to one of first and second operating modes; (4) adjusting the high-end intensity setting to a first high-end intensity setting value and the low-end intensity setting to a first low-end intensity setting value when operating in the first operating mode; and (5) adjusting the high-end intensity setting to a second high-end intensity setting value and the low-end intensity setting to a second low-end intensity setting value when operating in the second operating mode. The second high-end intensity setting value is less than the first high-end intensity setting value, and the second low-end intensity setting value is greater than the first low-end intensity setting value.

In addition, the present invention provides, a dimmer switch comprising means for conducting a load current from an AC power source to a lighting load for a conduction interval each half-cycle of the AC power source, and means for controlling the length of the conduction interval each half-cycle, where the improvement to the dimmer switch comprises: means for automatically changing the dimmer switch to one of first and second operating modes, means for setting a high-end intensity setting to a first high-end intensity setting value and a low-end intensity setting to a first low-end intensity setting value when operating in the first operating mode, and means for adjusting the high-end intensity setting to a second high-end intensity setting value and the low-end intensity setting to a second low-end intensity setting value when operating in the second operating mode, the second high-end intensity setting value less than the first high-end intensity setting value, and the second low-end intensity setting value greater than the first low-end intensity setting value.

Other features and advantages of the present invention will become apparent from the following description of the invention that refers to the accompanying drawings.

DETAILED DESCRIPTION OF THE INVENTION

Figure 1:
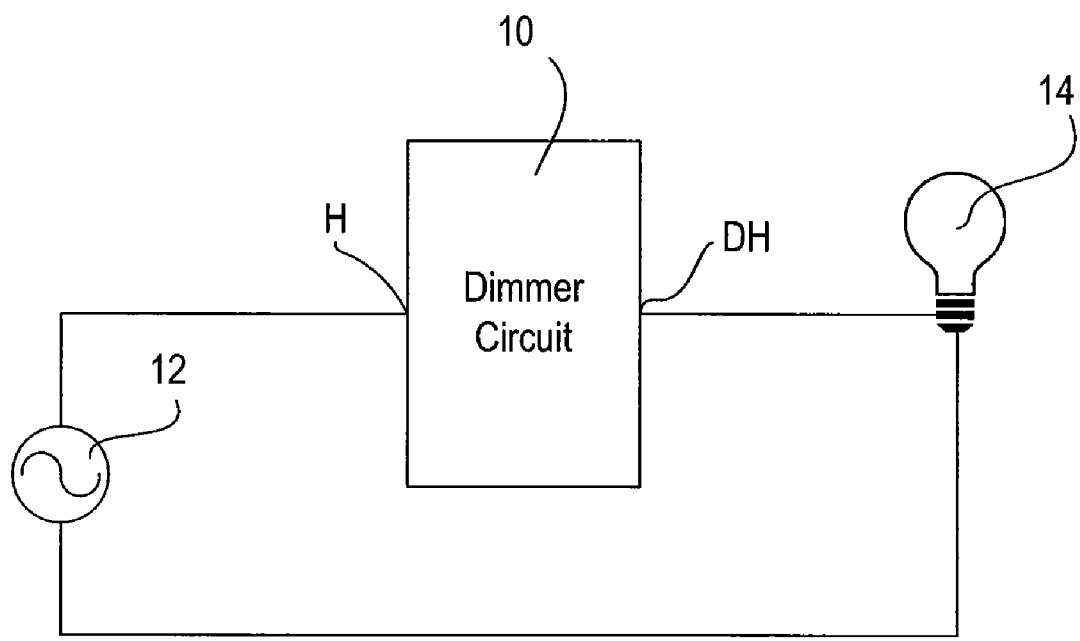
FIG. 1 is a simplified block diagram of a lighting system including a prior art dimmer circuit for controlling the intensity of an incandescent lamp.
Figure 2A:
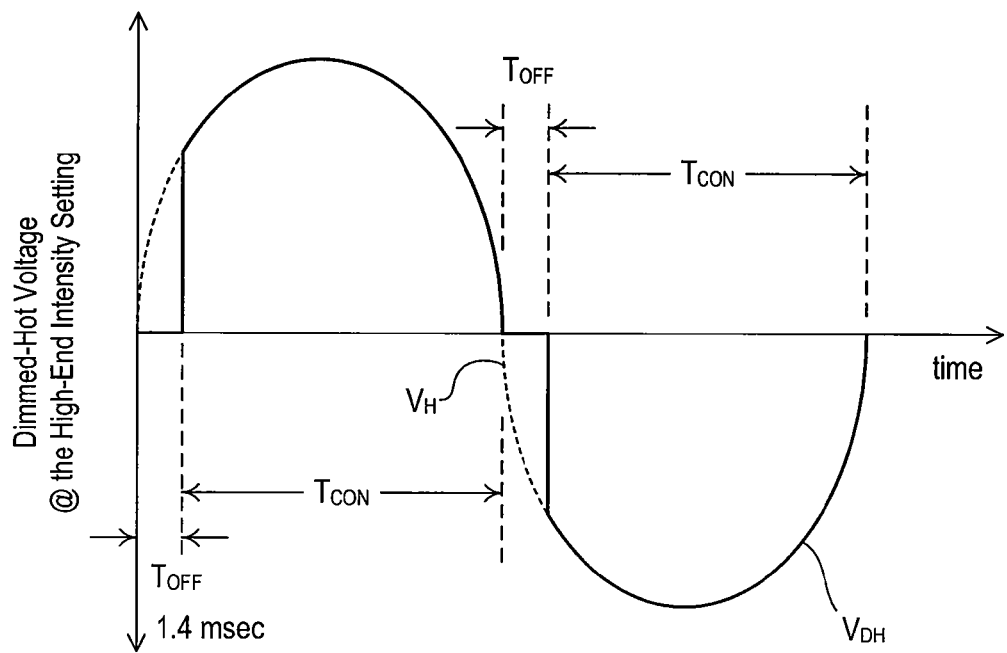
FIG. 2A is a simplified diagram of a hot voltage received by the dimmer circuit of FIG. 1 and a dimmed-hot voltage generated by the dimmer circuit to control the intensity of the incandescent lamp to a high-end intensity setting.
Figure 2B:
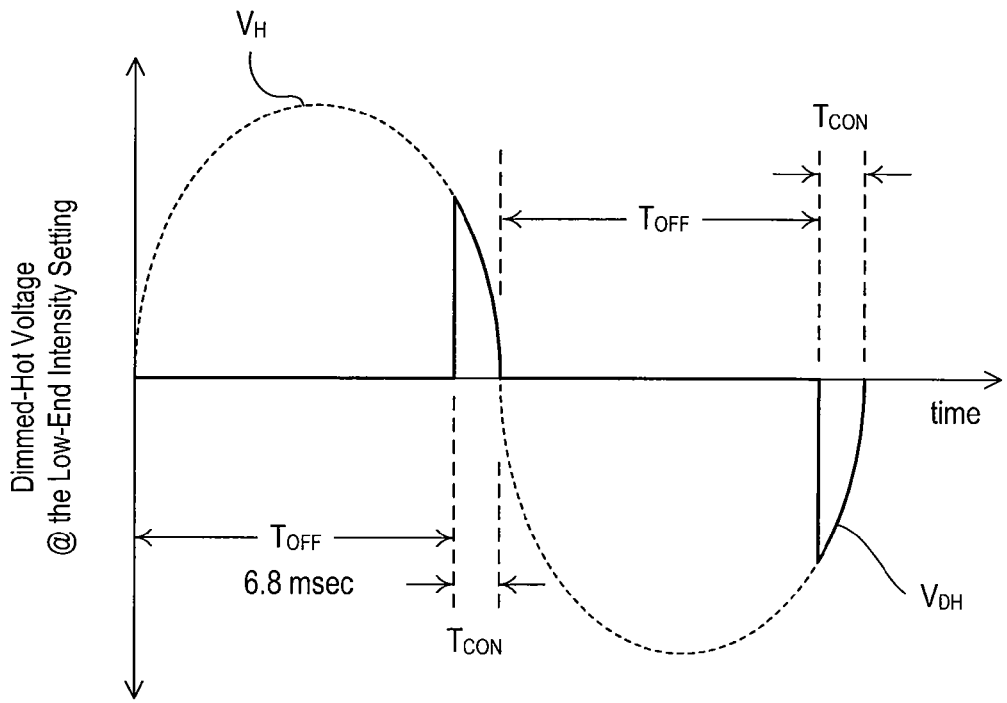
FIG. 2B is a simplified diagram of the hot voltage and the dimmed-hot voltage when the dimmer circuit of FIG. 1 is controlling the intensity of the incandescent lamp to a low-end intensity setting.
Figure 3:
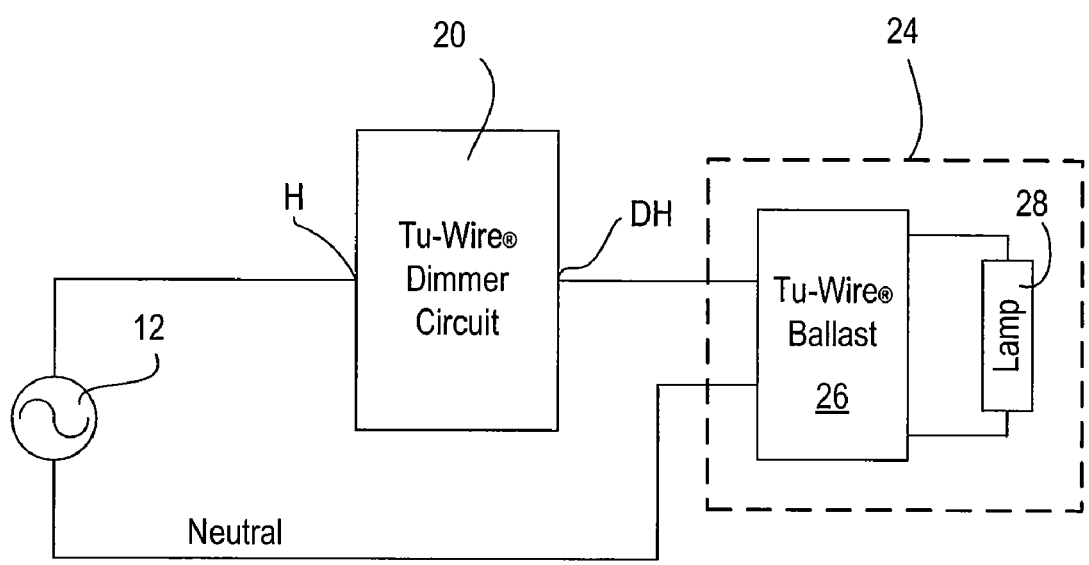
FIG. 3 is a simplified block diagram of a lighting system including a prior art fluorescent Tu-Wire® dimmer circuit for driving a fluorescent load.
Figure 4A:
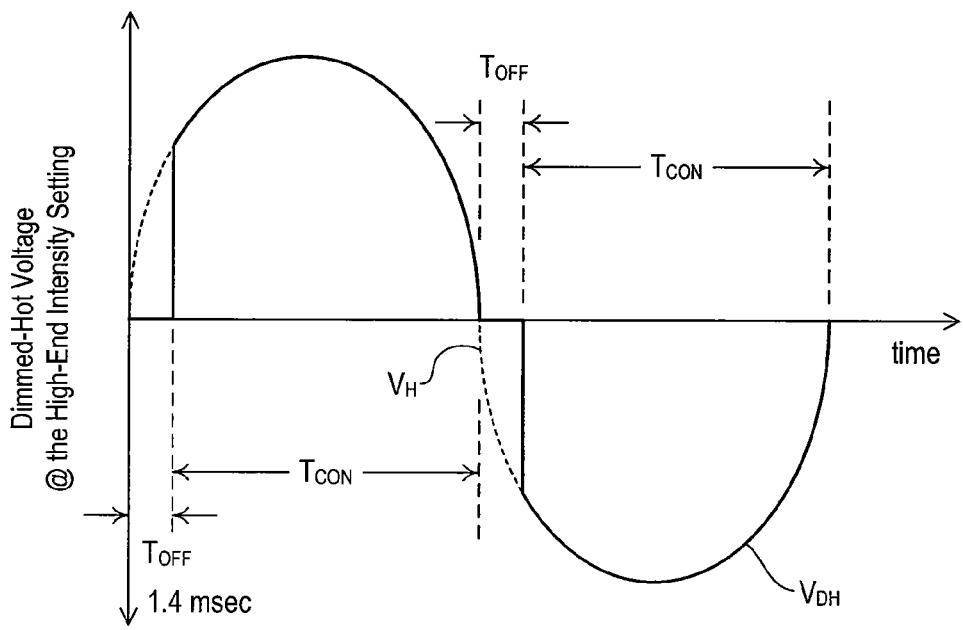
FIG. 4A is a simplified diagram of the hot voltage and the dimmed-hot voltage when the Tu-Wire® dimmer circuit of FIG. 3 is controlling the intensity of the fluorescent lamp to a high-end intensity setting.
Figure 4B:
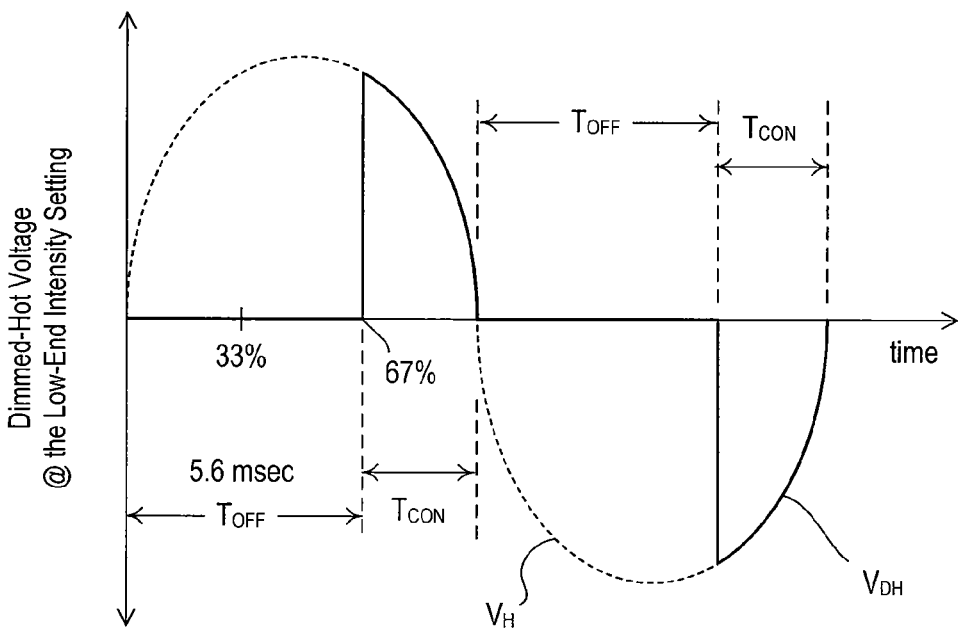
FIG. 4B is a simplified diagram of the hot voltage and the dimmed-hot voltage when the Tu-Wire® dimmer circuit of FIG. 3 is controlling the intensity of the fluorescent lamp to a low-end intensity setting.
Figure 5:
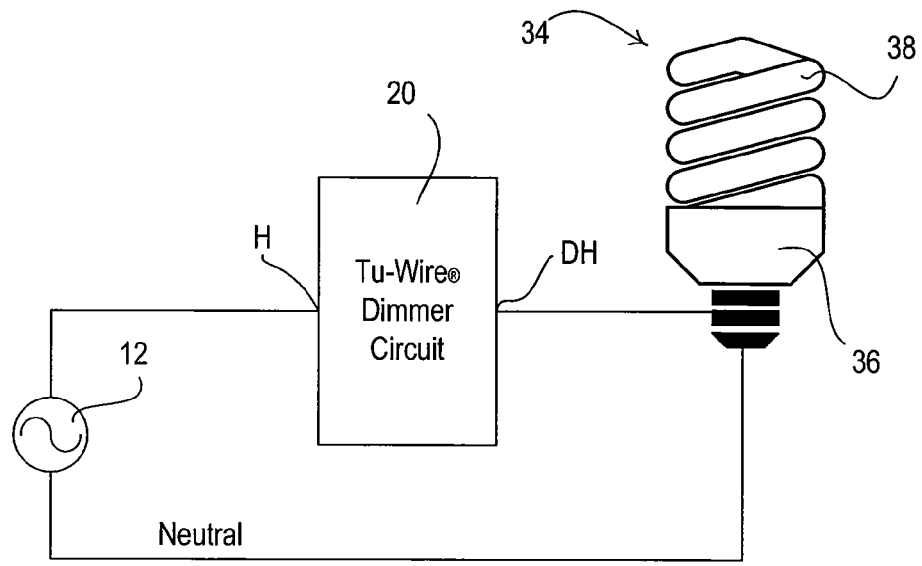
FIG. 5 is a simplified block diagram of the Tu-Wire® dimmer circuit of FIG. 3 controlling a dimmable screw-in compact fluorescent lamp.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 7:
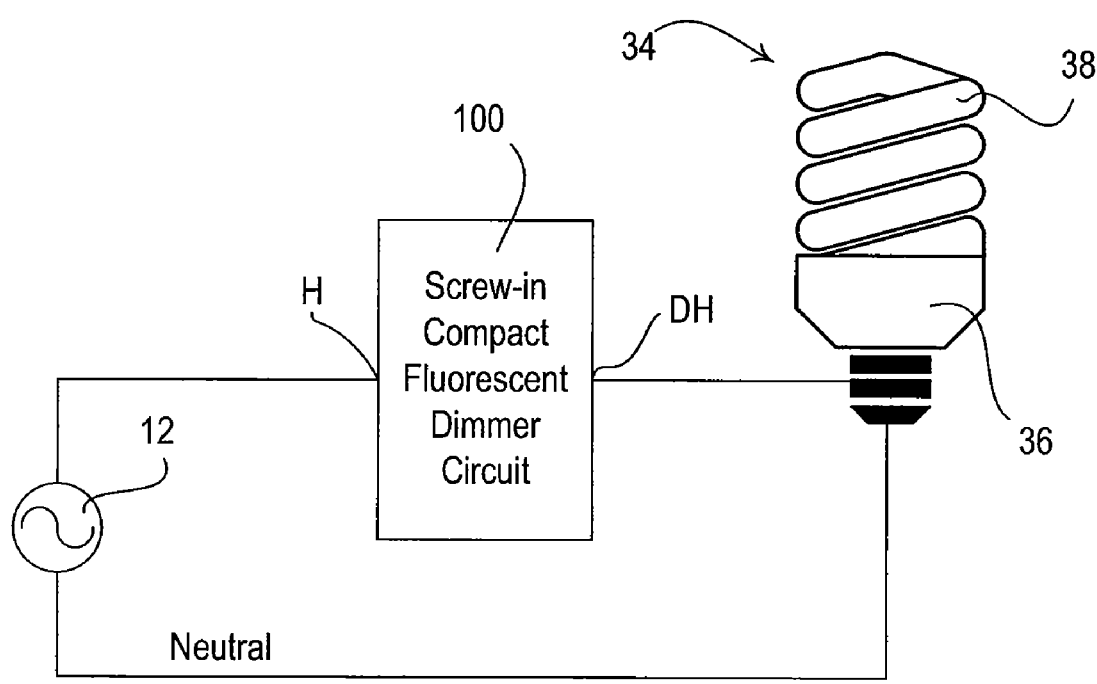
FIG. 7 is a simplified diagram of a dimmer switch for controlling the amount of power delivered to the dimmable screw-in compact fluorescent lamp according to a first embodiment of the present invention.

FIG. 7 is a simplified diagram of a dimmer switch 100 (i.e., a dimmer circuit) for controlling the amount of power delivered to the dimmable screw-in compact fluorescent lamp 34 according to a first embodiment of the present invention. Particularly, the dimmer switch 100 of the present invention is able to control the intensity of the dimmable screw-in compact fluorescent lamp 34 to the high-end intensity setting while avoiding multiple firings. It was discovered that reducing the conduction interval $T_{CON}$ by approximately 0.6 msec near the high-end intensity setting of the dimmer switch 100 did not visibly change the light output of the fluorescent lamp 38, but eliminated the problem of multiple firings. When controlling an incandescent lamp (as with the prior art dimmer circuit 10) or a two-wire ballast (as with the prior art dimmer circuit 20), it is desirable to maximize the conduction interval $T_{CON}$ to provide the maximum possible light output of the connected lighting load at the high-end intensity setting. In contrast, the dimmer switch 100 of the present invention has a conduction interval $T_{CON}$ at the high-end intensity setting that is shorter in length than the maximum conduction intervals of the prior art dimmer circuits 10, 20.

Figure 6:
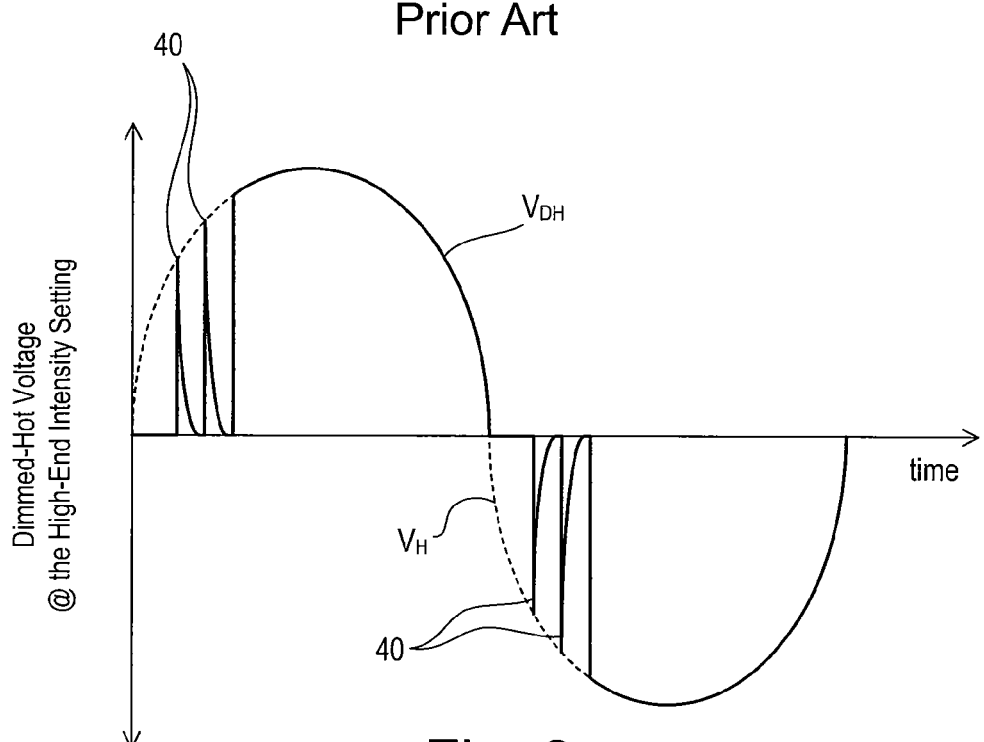
FIG. 6 is a simplified diagram of the hot voltage and the dimmed-hot voltage provided to the dimmable screw-in compact fluorescent lamp of FIG. 5 when the Tu-Wire® dimmer circuit is attempting to control the intensity of the fluorescent lamp to the high-end intensity setting.

In order to minimize the size and cost of the ballast circuit, the ballast circuit of a typical dimmable screw-in compact fluorescent lamp does not have an active front-end (i.e., a boost converter). Instead, the ballast circuit of a typical dimmable screw-in compact fluorescent lamp simply comprises a rectifier (e.g., a full-wave rectifier diode bridge) having an AC input coupled to the AC power supply 12 and a DC output coupled to a bus capacitor. When the prior art Tu-Wire® dimmer circuit 20 attempts to control the dimmable screw-in compact fluorescent lamp 34 to the high-end intensity setting, the triac is fired before the instantaneous magnitude of the AC line voltage rises above the voltage across the bus capacitor (plus the voltage drop of the rectifier) of the ballast circuit 36. Accordingly, the current drawn by the ballast circuit 36 does not exceed the latching current (i.e., 15 mA) of the triac and the triac fires multiple times (as shown in FIG. 6).

It was determined that the off time $T_{OFF}$ of the triac at the beginning of each half-cycle could be increased (i.e., the conduction interval $T_{CON}$ could be reduced), such that the triac is prevented from being fired until after the instantaneous magnitude of the AC line voltage exceeds the voltage across the bus capacitor. Specifically, the conduction interval $T_{CON}$ can be reduced to less than approximately 75% of each half-cycle without reducing the maximum light output of the dimmable screw-in compact fluorescent lamp 34.

Figure 8A:
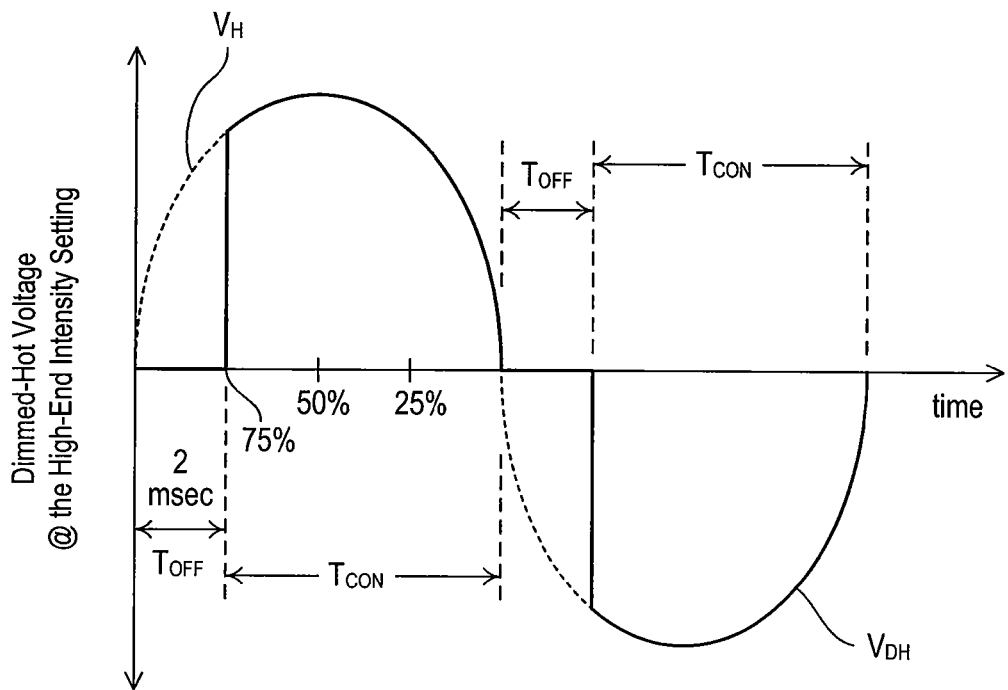
FIG. 8A is a simplified diagram of the hot voltage and the dimmed-hot voltage when the dimmer switch of FIG. 7 is controlling the intensity of the dimmable screw-in compact fluorescent lamp to a high-end intensity setting.
Figure 8B:
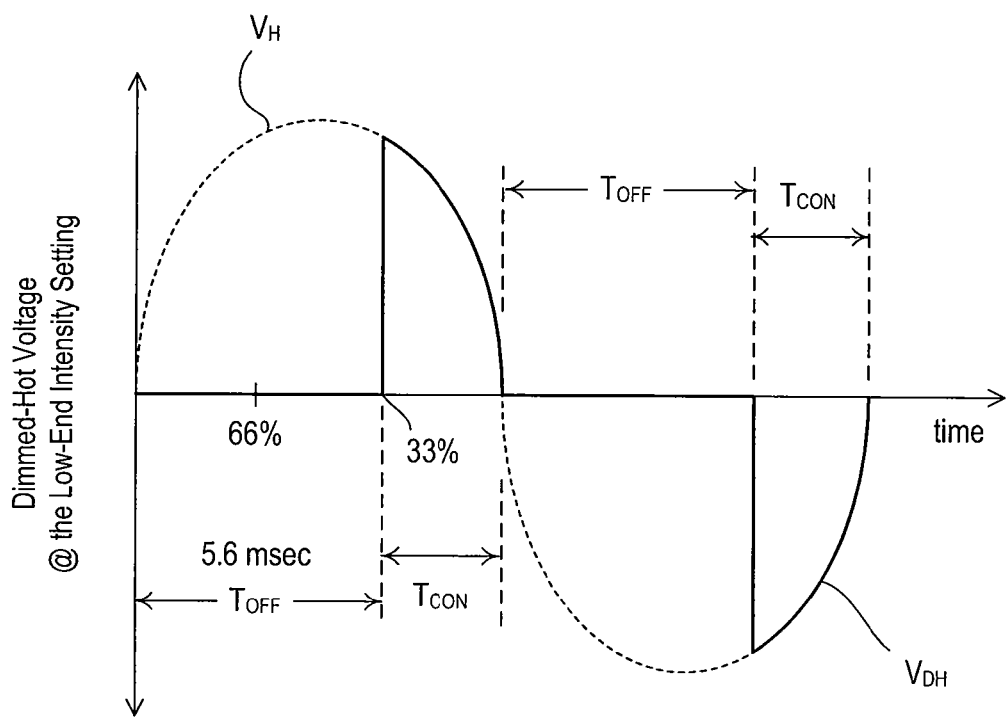
FIG. 8B is a simplified diagram of the hot voltage and the dimmed-hot voltage when the dimmer switch of FIG. 7 is controlling the intensity of the dimmable screw-in compact fluorescent lamp to a low-end intensity setting.

FIG. 8A is a simplified diagram of the hot voltage $V_H$ and the dimmed-hot voltage $V_{DH}$ provided to the dimmable screw-in compact fluorescent lamp 34 when the dimmer switch 100 is controlling the intensity of the dimmable screw-in compact fluorescent lamp to the high-end intensity setting. FIG. 8B is a simplified diagram of the hot voltage $V_H$ and the dimmed-hot voltage $V_{DH}$ when the dimmer switch 100 is controlling the intensity of the dimmable screw-in compact fluorescent lamp 34 to the low-end intensity setting. As shown in FIG. 8A, the high-end intensity setting has been reduced, such that the off time $T_{OFF}$ is greater than approximately 2.2 msec, and is preferably 2.5 msec. The magnitude of the resulting dimmed-hot voltage $V_{DH}$ is approximately 108 to 114 $V_{RMS}$. Accordingly, the dimmer switch 100 conducts current to the fluorescent lamp 34 for the conduction interval $T_{CON}$ for less than approximately 75% of each half-cycle, and preferably less than approximately 70% of each half-cycle, at the high-end intensity setting. The low-end intensity setting as shown in FIG. 8B remains the same as that of the prior art dimmer circuit 20 (i.e., the off time $T_{OFF}$ is approximately 5.6 msec).

Figure 9:
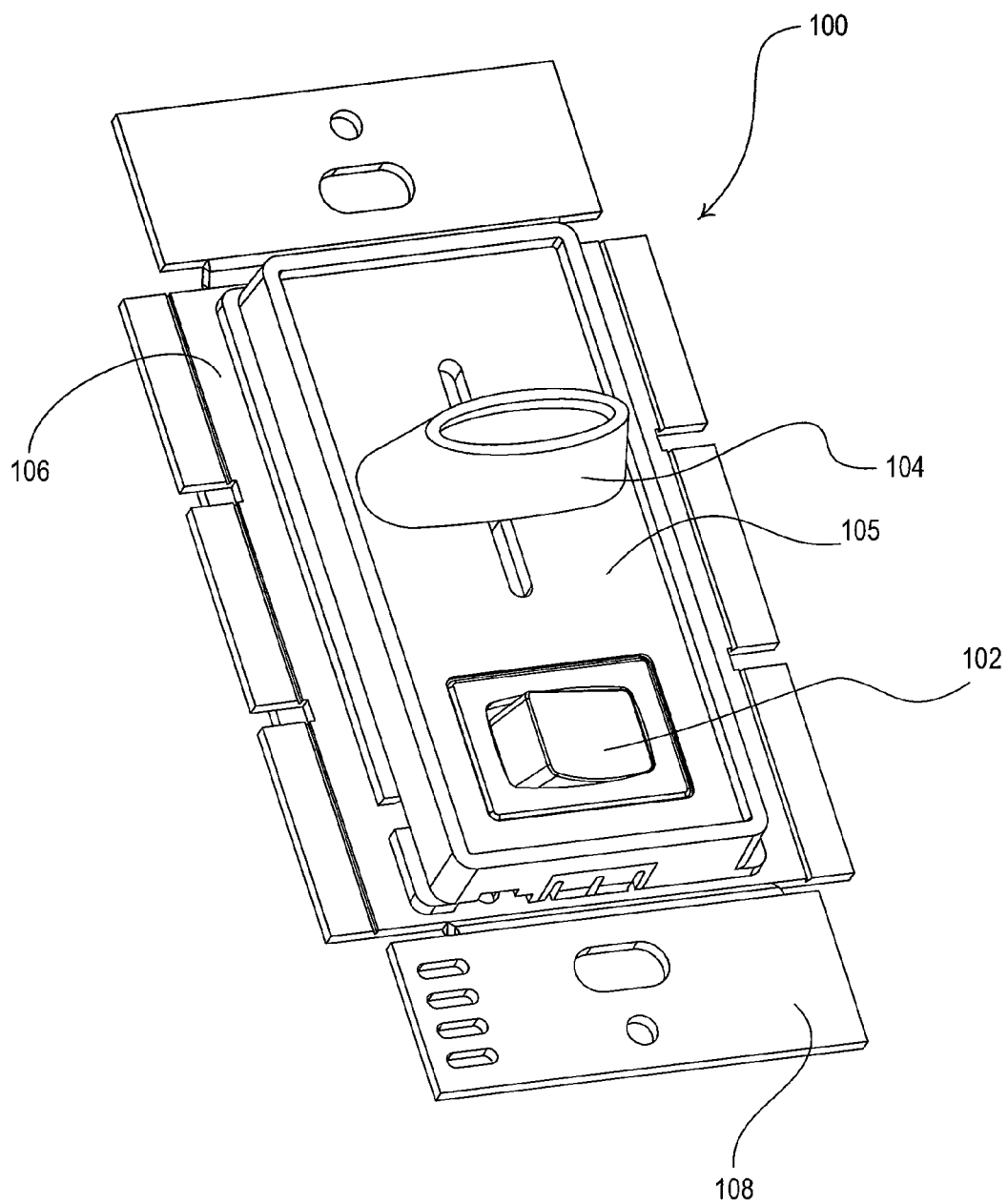
FIG. 9 is a perspective view of an example of the user interface of the dimmer switch of FIG. 7 according to the first embodiment of the present invention.

FIG. 9 is a perspective view of an example of the user interface of the dimmer switch 100. The dimmer switch 100 includes a rocker switch 102 and an intensity adjustment actuator 104 (i.e., a slider actuator). The rocker switch 102 allows for turning on and off the screw-in compact fluorescent lamp 34. The intensity adjustment actuator 104 allows for adjustment of the lighting intensity of the fluorescent lamp 34 from the low-end intensity setting to the high-end intensity setting. The dimmer switch 100 also includes a bezel 105 attached to a front surface 106 of a mounting yoke 108 and a printed circuit board (not shown) mounted inside the dimmer switch 100. The bezel 105 is adapted to be received in an opening of a faceplate (not shown).

Figure 10:
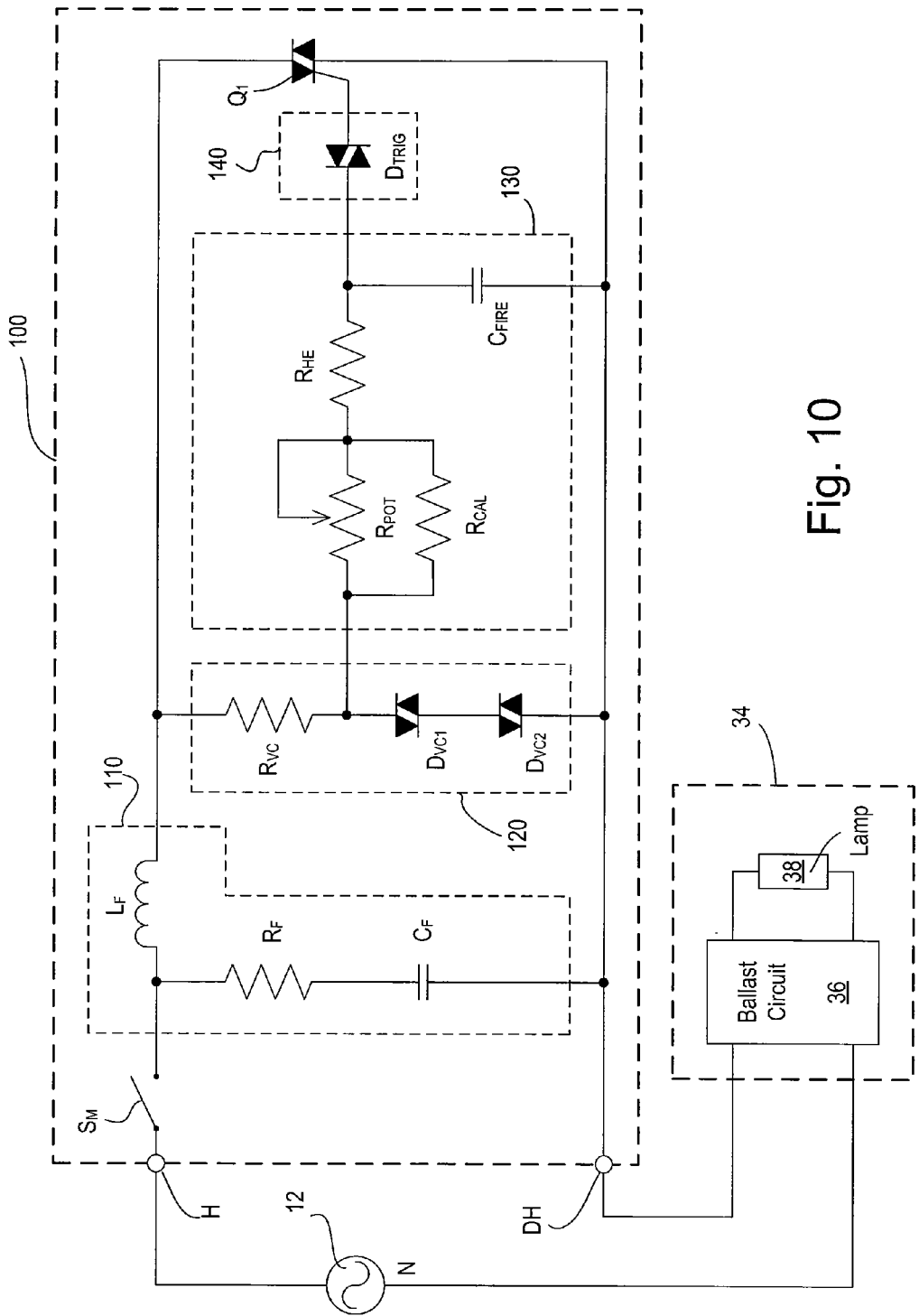
FIG. 10 is a simplified schematic diagram of the dimmer switch of FIG. 7 according to the first embodiment of the present invention.

FIG. 10 is a simplified schematic diagram of the dimmer switch 100 according to the present invention. The dimmer switch 100 includes a controllably conductive switching device coupled in series between the hot terminal and the dimmed-hot terminal for controlling the amount of power delivered to the screw-in compact fluorescent lamp 34. Specifically, as shown in FIG. 10, the controllably conductive switching device of the dimmer switch 100 is implemented as a triac $Q_1$. The triac $Q_1$ includes a control input (i.e., a gate) for rendering the triac conductive after the off time each half-cycle of the AC power source 12. The triac $Q_1$ has a low holding current rating, for example, less than approximately 35 mA, but preferably approximately 15 mA.

The dimmer switch 100 also comprises a mechanical switch $S_M$, a filter circuit 110 and a phase-cut AC drive circuit including a voltage compensation circuit 120, a timing circuit 130, and a trigger circuit 140. The voltage compensation circuit 120, the timing circuit 130, and the trigger circuit 140 operate to render the triac conductive for the conduction interval $T_{CON}$ each half-cycle of the AC power source 12. The mechanical switch $S_M$ comprises, for example, a single-pole single-throw (SPST) switch and is coupled in series electrical connection between the AC power source 12 and the remainder of the circuitry of the dimmer switch 100. The mechanical switch $S_M$ is mechanically coupled to the rocker switch 102, such that a user of the dimmer switch 100 is able to actuate the rocker switch to open and close the mechanical switch and to thus control the screw-in compact fluorescent lamp 34 to be off and on, respectively.

The filter circuit 110 includes a resistor $R_F$ (e.g., having a resistance of 220Ω) and a capacitor $C_F$ (e.g., having a capacitance of 0.047 μF) coupled in series between the hot terminal H and the dimmed-hot terminal DH. The filter circuit 110 also includes an inductor $L_F$ that is coupled in series with the triac $Q_1$ and preferably has an inductance of 10 to 50 μH. The main purpose of the filter circuit 110 is to reduce the EMI noise present at the hot terminal H and the dimmed-hot terminal DH. The EMI noise is generated by the switching of the triac $Q_1$ each half-cycle of the AC power source 12. However, the resistor $R_F$ and the capacitor $C_F$ also function to minimize ringing of the dimmed-hot voltage $V_{DH}$ when the triac $Q_1$ changes from being non-conductive to conductive each half-cycle.

The series combination of the voltage compensation circuit 120 and the timing circuit 130 is coupled in parallel with the triac $Q_1$. The voltage compensation circuit 120 compensates for voltage fluctuations of the AC source voltage of the AC power source 12, such that the length of the conduction interval of the triac $Q_1$ does not undesirably change from one half-cycle to the next, as will be described in greater detail below. The timing circuit 130 has an output coupled to the trigger circuit 140 for providing a timing voltage representative of a desired light intensity of the screw-in compact fluorescent lamp 34. The trigger circuit 140 preferably comprises a diac $D_{TRIG}$ (e.g., part number DB3 manufactured by ST Microelectronics), which has a break-over voltage of approximately 30 V and is coupled in series between the output of the timing circuit 130 and the gate of the triac $Q_1$.

The timing circuit 130 includes a firing capacitor $C_{FIRE}$ and a potentiometer $R_{POT}$ that is mechanically coupled to the intensity adjustment actuator 104. The firing capacitor $C_{FIRE}$ preferably has a capacitance of 0.047 μF and charges each half-cycle through the potentiometer $R_{POT}$. The timing voltage is produced across the firing capacitor $C_{FIRE}$ and increases in magnitude with respect to time as the firing capacitor charges. The potentiometer $R_{POT}$ provides a variable resistance, such that the user may adjust the potentiometer to adjust the rate at which the firing capacitor $C_{FIRE}$ charges to thus set the desired intensity of the fluorescent lamp 34. During each half-cycle, the timing voltage increases in magnitude at a rate dependent upon the present resistance of the potentiometer $R_{POT}$ and thus the desired intensity of the lamp. When the timing voltage exceeds the break-over voltage of the diac $D_{TRIG}$, the voltage across the diac quickly decreases in magnitude to a break-back voltage. The change in voltage across the diac $D_{TRIG}$ causes the diac to conduct a gate current through the gate of the triac $Q_1$, thus rendering the triac conductive.

The potentiometer $R_{POT}$ of the timing circuit 130 has two main terminals and a wiper terminal coupled to one of the main terminals. The potentiometer $R_{POT}$ preferably has a maximum resistance of 300 kΩ. The wiper of the potentiometer $R_{POT}$ is moveable, so that the resistance between one of the two main terminals of the potentiometer is variable from 0Ω to 300 kΩ. A calibration resistor $R_{CAL}$ is coupled between the two main terminals of the potentiometer $R_{POT}$ and functions to establish the low-end intensity setting of the dimmer switch 100. The calibration resistor $R_{CAL}$ preferably has a resistance of approximately 110 kΩ, such that the resistance between the two main terminals of the potentiometer is scaled to range from 0Ω to about 80 kΩ.

The timing circuit 130 further comprises a high-end intensity regulation circuit, e.g., a high-end limiting resistor $R_{HE}$ coupled in series with the parallel combination of the potentiometer $R_{POT}$ and the calibration resistor $R_{CAL}$. The firing capacitor $C_{FIRE}$ is operable to charge through the potentiometer $R_{POT}$, the calibration resistor $R_{CAL}$, and the high-end resistor $R_{HE}$. The junction of the firing capacitor $C_{FIRE}$ and the high-end resistor $R_{HE}$ is the output to the trigger circuit 140. The high-end resistor $R_{HE}$ has a resistance greater than approximately 22 kΩ, such that the off time $T_{OFF}$ of the triac $Q_1$ is at least 2.2 msec, and the conduction interval $T_{CON}$ is limited to approximately 75% of each half-cycle. This increase in resistance of the high-end resistor $R_{HE}$ unexpectedly makes it possible to achieve proper dimming of a dimmable screw-in compact fluorescent lamp, which could not be acceptably dimmed by the prior art dimmer circuits 10, 20. Preferably, the resistance of the high-end resistor $R_{HE}$ is 44 kΩ, such that the off time $T_{OFF}$ of the triac $Q_1$ is approximately 2.5 msec, and the conduction interval $T_{CON}$ is limited to approximately 70% of each half-cycle.

The voltage compensation circuit 120 includes a resistor $R_{VC}$ (e.g., having a resistance of 27 kΩ) and two series-coupled diacs $D_{VC1}$, $D_{VC2}$ (e.g., each having a break-over voltage of 30 V). Since the diacs $D_{VC1}$, $D_{VC2}$ have negative impedance transfer functions, the current through the diacs decreases as the voltage across the diacs increases. Thus, when the AC source voltage of the AC power source 12 (and thus, the voltage across the voltage compensation circuit 120) decreases, the current through the resistor $R_{VC}$ and the diacs $D_{VC1}$, $D_{VC2}$ decreases and the voltage across the diacs increases. As a result, the current flowing through the potentiometer $R_{POT}$, the calibration resistor $R_{CAL}$, and the high-end resistor $R_{HE}$, and into the firing capacitor $C_{FIRE}$ increases, thus causing the timing voltage to exceed the break-over voltage of the diac $D_{TRIG}$ more quickly during the present half-cycle. The conduction interval $T_{CON}$ is thus longer for the present half-cycle, thereby compensating for the decreased output voltage of the AC power source 12 and maintaining the light output of the lamp 34 substantially constant. A similar situation occurs when the AC source voltage of the AC power source 12 increases and the conduction interval $T_{CON}$ is accordingly controlled to be shorter.

The voltage compensation circuit 120 also operates to allow the ballast circuit 36 to strike the screw-in compact fluorescent lamp 34 if the switch $S_M$ is closed (i.e., changes from open to closed) when the dimmer switch 100 is controlling the lamp to a light intensity near the low-end intensity setting. This eliminates the occurrence of the lamp "popping on" if the potentiometer $R_{POT}$ is adjusted to increase the intensity of the lamp from the low-end intensity setting to a point at which the lamp can strike.

Therefore, the dimmer switch 100 according to the present invention provides smooth dimming of a dimmable screw-in compact fluorescent lamp. Since the high-end intensity setting is significantly lower, and the off time $T_{OFF}$ is greater, than in the prior art dimmer circuits 10, 20, the dimmer switch 100 prevents unwanted multiple firings of the controllably conductive switching device $Q_1$, thus avoiding flickering of the fluorescent lamp, audible noise in the lamp, increased EMI noise, and unneeded stress on the components of the dimmer switch and the ballast circuit of the lamp.

Figure 11:
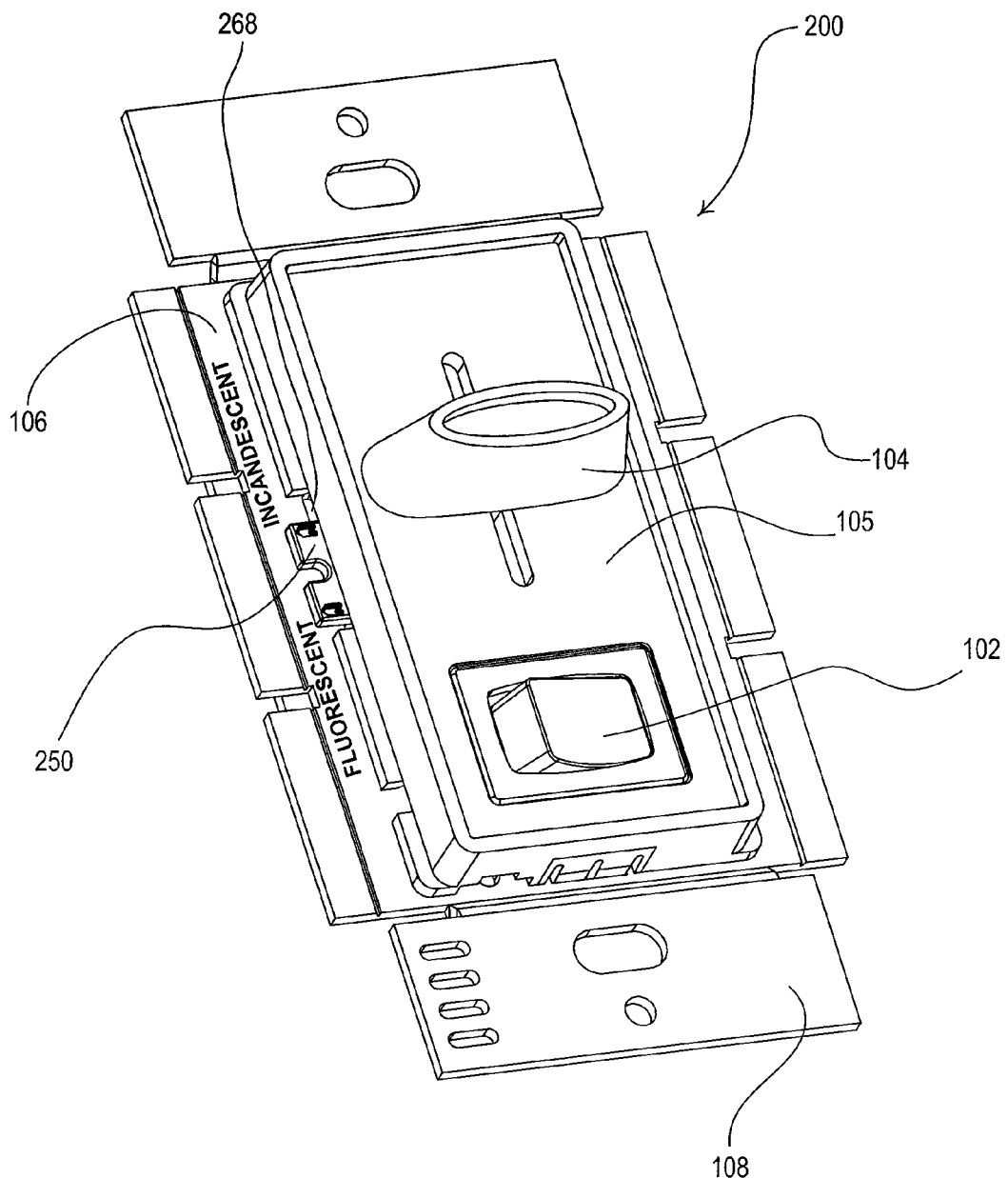
FIGS. 11 and 12 are perspective views of a user interface of a dimmer switch according to a second embodiment of the present invention.
Figure 12:
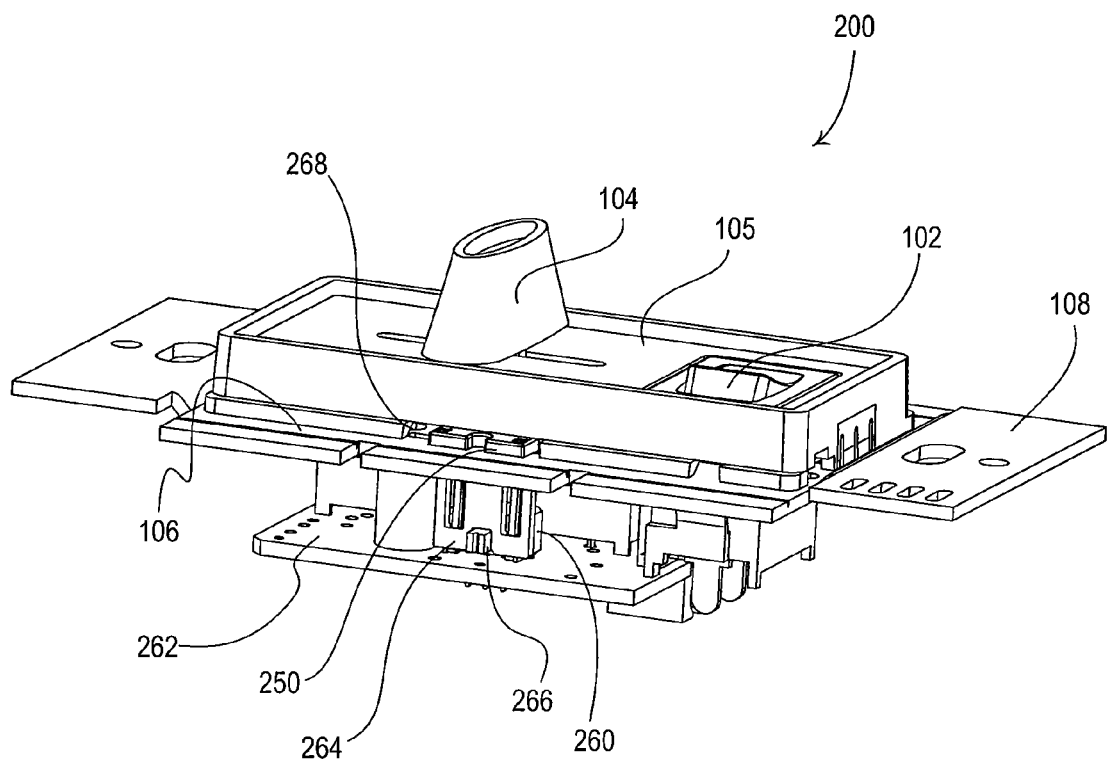

FIGS. 11 and 12 are perspective views of a user interface of a dimmer switch 200 according to a second embodiment of the present invention. The dimmer switch 200 includes a user-accessible operating mode adjustment actuator 250 that allows a user to change the dimmer switch 200 between an incandescent load operating mode and a screw-in compact fluorescent load operating mode. When the operating mode adjustment actuator 250 is in a first position, the dimmer switch 200 operates in the incandescent load operating mode. Accordingly, the high-end intensity setting of the dimmer switch is adjusted to a first high-end intensity setting value and the low-end intensity setting is adjusted to a first low-end intensity setting value. When the operating mode adjustment actuator 250 is in a second position, the dimmer switch 100 operates in the screw-in compact fluorescent load operating mode, such that the high-end intensity setting is adjusted to a second high-end intensity setting value and the low-end intensity setting is adjusted to a second low-end intensity setting value. Preferably, the second high-end intensity setting value is lower than the first high-end intensity setting value, and the second low-end intensity setting value is higher than the first low-end intensity setting value.

Referring to FIG. 12, the operating mode adjustment actuator 250 is coupled to a mechanical switch 260 mounted on a printed circuit board 262 via a coupling member 264. The mechanical switch 260 includes an actuation knob 266, which is received in a notch in the coupling member 264. The operating mode adjustment actuator 250 is provided in an opening 268 between the bezel 105 and a front surface 206 of a mounting yoke 208, such that the user is able to change the operating mode from the user interface of the dimmer switch 200. The yoke 208 includes engraving (i.e., the words "INCANDESCENT" and "FLUORESCENT") near the operating mode adjustment actuator 250 to specify which of the operating modes the dimmer switch 200 is selected (depending upon the position of the operating mode adjustment actuator). Preferably, the operating mode adjustment actuator 250 is located such that the adjustment actuator cannot be seen when the faceplate is mounted to the dimmer switch 200, but can be accessed when the faceplate is removed.

Figure 13:
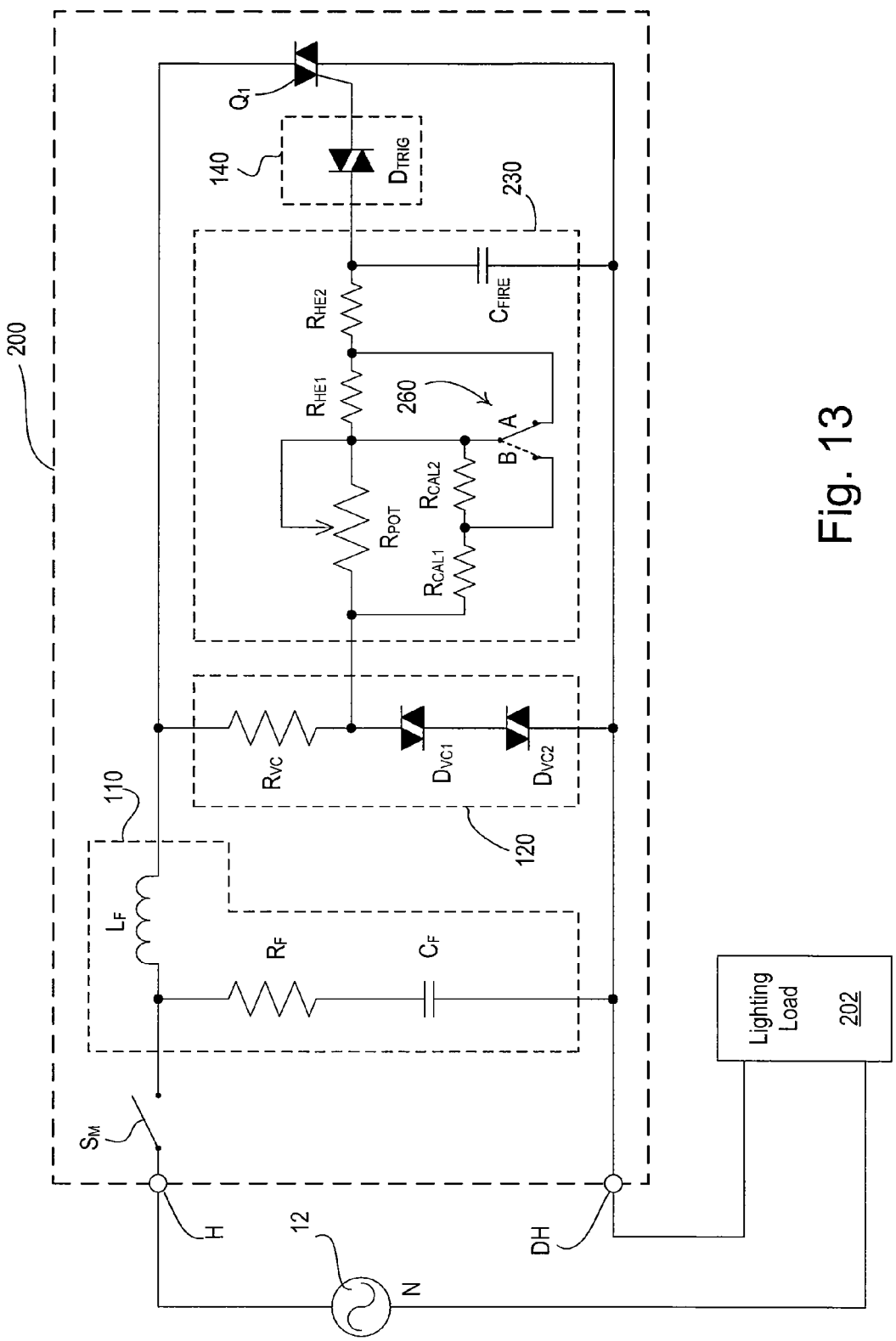
FIG. 13 is a simplified schematic diagram of the dimmer switch of FIGS. 11 & 12.

FIG. 13 is a simplified schematic diagram of the dimmer switch 200 coupled to a lighting load 202 that may comprise an incandescent lamp or a dimmable screw-in compact fluorescent lamp. The mechanical switch 260 that is coupled to the load adjustment actuator 250 preferably comprises a single-pole double-throw (SPDT) switch and is included as part of a timing circuit 230. The timing circuit 230 includes two calibration resistors $R_{CAL1}$, $R_{CAL2}$ that are coupled in series and preferably each have resistances of 95 kΩ and 30 kΩ, respectively. The series combination of the calibration resistors $R_{CAL1}$, $R_{CAL2}$ is coupled in parallel with the potentiometer $R_{POT}$ (i.e., in place of the calibration resistor $R_{CAL}$ of the dimmer switch 100 of the first embodiment). The timing circuit 230 also includes two high-end resistors $R_{HE1}$, $R_{HE2}$, which are coupled in series and preferably have resistances of 22 kΩ and 5.6 kΩ, respectively. The series combination of the high-end resistors $R_{HE1}$, $R_{HE2}$ is coupled between the potentiometer $R_{POT}$ and the trigger circuit 140 (i.e., in place of the high-end resistor $R_{HE}$ of the dimmer switch 100 of the first embodiment).

The mechanical switch 260 has a moveable contact and two fixed contacts. The moveable contact is coupled to the junction of the potentiometer $R_{POT}$, the second calibration resistor $R_{CAL2}$, and the first high-end resistor $R_{HE1}$. The first fixed contact is coupled to the junction of the two calibration resistors $R_{CAL1}$, $R_{CAL2}$, while the second fixed contact is coupled to the junction of the two high-end resistors $R_{HE1}$, $R_{HE2}$. When the operating mode adjustment actuator 250 is in the first position and the mechanical switch 260 is in position A (as shown in FIG. 13), the dimmer switch 200 is in the incandescent operating mode. At this time, the first high-end resistor $R_{HE1}$ is shorted out and only the second high-end resistor $R_{HE2}$ (i.e., only 5.6 kΩ) is coupled in series between the potentiometer $R_{POT}$ and the trigger circuit 140. Accordingly, the high-end intensity setting of the dimmer switch 200 is adjusted to the first high-end intensity setting value (e.g., the off time $T_{OFF}$ of the triac $Q_1$ is approximately 1.4 msec). Further, the series combination of the calibration resistors $R_{CAL1}$, $R_{CAL2}$ (i.e., 150 kΩ) is coupled in parallel with the potentiometer $R_{POT}$, such that the low-end intensity setting of the dimmer switch 200 is adjusted to the first low-end intensity setting value (e.g., the off time $T_{OFF}$ of the triac $Q_1$ is approximately 6.8 msec).

When the load adjustment actuator 250 is in the second position and the mechanical switch 260 is in position B, the dimmer switch 200 is in the screw-in compact fluorescent operating mode. The second calibration resistor $R_{CAL2}$ is shorted out and only the first calibration resistor $R_{CAL1}$ (i.e., only 75 kΩ) is coupled in parallel with the potentiometer $R_{POT}$, such that the low-end intensity setting of the dimmer switch 200 is adjusted to the second low-end intensity setting value (e.g., the off time $T_{OFF}$ of the triac $Q_1$ is approximately 5.6 msec). The series-combination of the two high-end resistors $R_{HE1}$, $R_{HE2}$ (i.e., 27.6 kΩ) is coupled in series between the potentiometer $R_{POT}$ and the trigger circuit 140, and the high-end intensity setting of the dimmer switch 200 is adjusted to the second high-end intensity setting value (e.g., the off time $T_{OFF}$ of the triac $Q_1$ is approximately 2.5 msec).

The conduction interval $T_{CON}$ at the high-end intensity setting in the screw-in compact fluorescent operating mode is preferably shorter in length than the conduction interval $T_{CON}$ at the high-end intensity setting in the incandescent operating mode. The conduction interval $T_{CON}$ at the low-end intensity setting in the screw-in compact fluorescent operating mode is preferably greater in length than the conduction interval $T_{CON}$ at the low-end intensity setting in the incandescent operating mode. Therefore, the dynamic range of the dimmer switch 200 (i.e., the range of the value of the conductive interval $T_{CON}$ at the high-end intensity setting to the value of the conduction interval $T_{CON}$ at the low-end intensity) decreases when the dimmer switch changes from the incandescent operating mode to the screw-in compact fluorescent operating mode.

Figure 14:
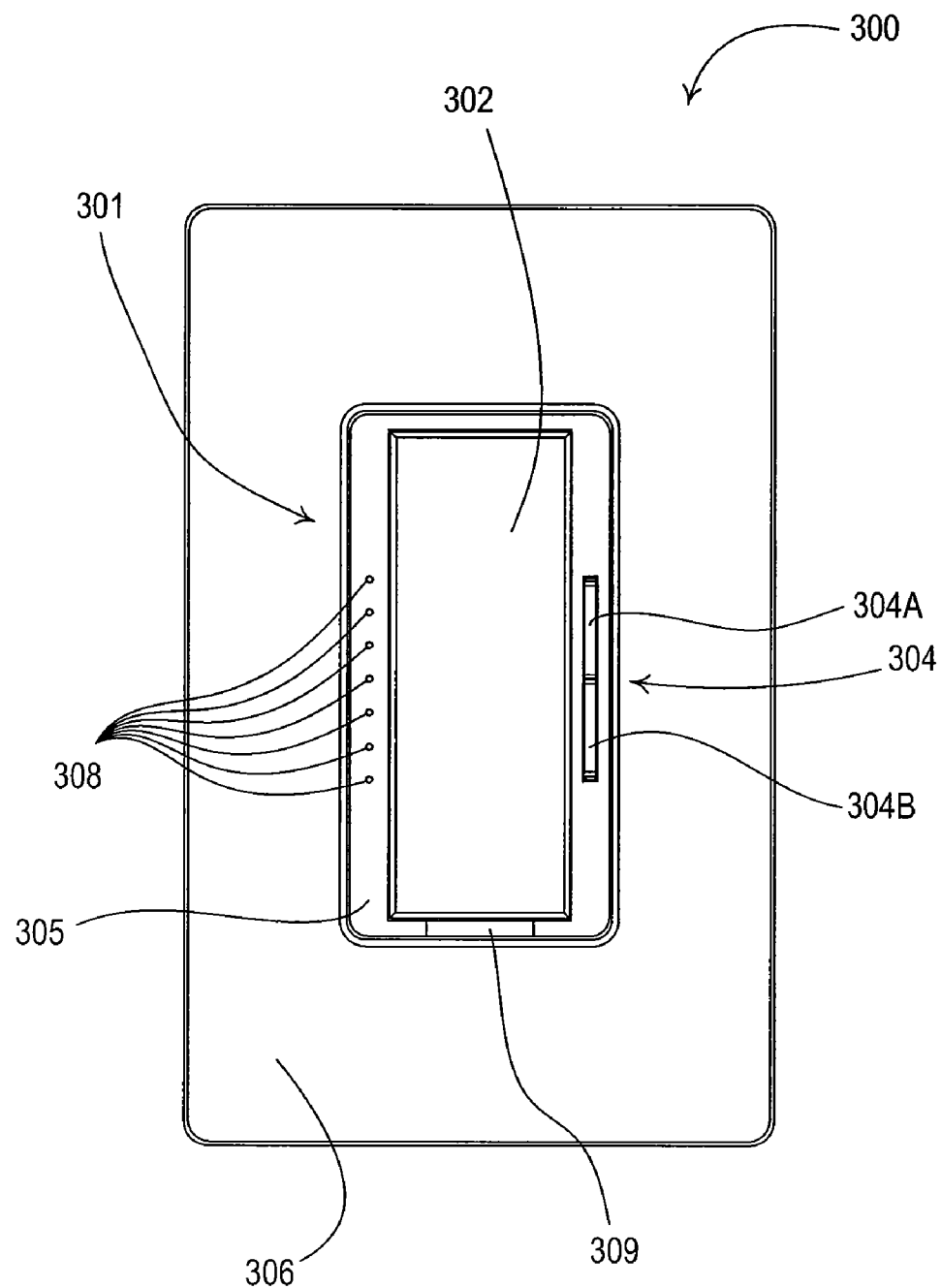
FIG. 14 is a front view of a user interface of a "smart" dimmer switch according to a third embodiment of the present invention.

FIG. 14 is a front view of a user interface 301 of a "smart" dimmer switch 300 according to a third embodiment of the present invention. The dimmer switch 300 comprises a control actuator 302 and an intensity adjustment actuator 304 (i.e., a rocker switch). An actuation of the control actuator 302 causes the dimmer switch 300 to toggle the lighting load 202 between on and off. An actuation of the upper portion 304A of the intensity adjustment actuator 304 raises the light intensity of the lighting load 202, while an actuation of the lower portion 304B of the intensity adjustment actuator lowers the light intensity. The control actuator 302 and the intensity adjustment actuator 304 are provided on the front surface of a bezel 305, which is received in the opening of a faceplate 306. An air-gap switch actuator 309 actuates an internal mechanical switch $S_{AG}$ (FIG. 15) to provide an actual air-gap break between the AC power source 12 and the lighting load 202.

The dimmer switch 300 also includes a plurality of visual indicators 308, e.g., light-emitting diodes (LEDs) that are arranged in a linear array on the bezel 305. The visual indicators 308 are illuminated to represent the present light intensity level of the lighting load 202. The light intensity level is typically expressed as a percentage of full intensity, i.e., the light intensity level may range from 1% to substantially 100%. When the dimmer switch 300 is controlling the intensity of the lighting load 202 to the low-end intensity setting, the lowest visual indicator 308 is illuminated. When the dimmer switch 300 is controlling the intensity of the lighting load 202 to the high-end intensity setting, the highest visual indicator 308 is illuminated.

According to the present invention, a user may change the dimmer switch 300 between the incandescent operating mode and the screw-in compact fluorescent operating mode from the user interface 301 of the dimmer switch by using, for example, an advanced programming mode. The advanced programming mode may be entered, for example, by holding the control actuator 302, while cycling power to the dimmer switch 300, e.g., by actuating the air-gap switch actuator 309. The advanced programming mode also allows the user to modify other advanced programming features of the dimmer switch 300, such as a protected preset or a fade rate. A dimmer switch having an advanced programming mode is described in greater detail in commonly-assigned U.S. Pat. No. 7,190,125, issued Mar. 13, 2007, entitled PROGRAMMABLE WALLBOX DIMMER, the entire disclosure of which is hereby incorporated by reference.

Often, dimmable screw-in compact fluorescent lamps from different manufacturers may be controlled to different low-end intensity settings. Therefore, the dimmer switch 300 of the present invention allows the user to adjust the minimum low-end intensity setting of the dimmer switch 300 to match the minimum low-end intensity setting of a connected dimmable screw-in compact fluorescent lamp, based on the manufacturer of the lamp, in order to provide the maximum range of dimming of the lamp. Preferably, the minimum low-end intensity setting of the dimmer switch 300 is adjusted using the advanced programming mode so as to ensure that the low-end intensity setting of the dimmer switch 300 is adjusted to the appropriate level for the particular connected dimmable screw-in compact fluorescent lamp.

Figure 15:
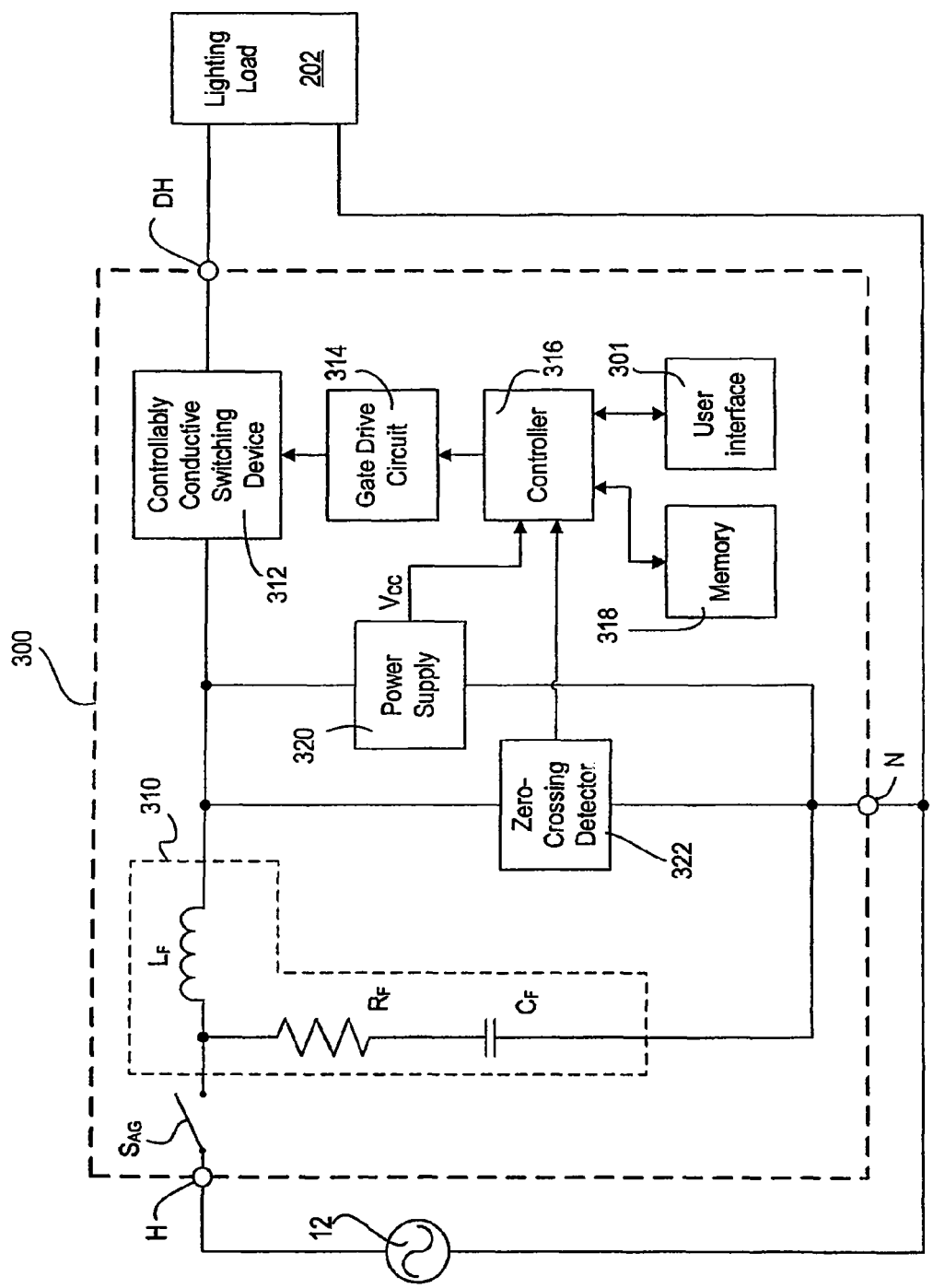
FIG. 15 is a simplified block diagram of the dimmer switch of FIG. 14.

FIG. 15 is a simplified block diagram of the "smart" dimmer switch 300. The dimmer switch 300 includes a controllably conductive switching device 312 coupled in series electrical connection between the hot terminal H and the dimmed hot terminal DH for controlling the intensity of the lighting load 202. The controllably conductive switching device 312 may be implemented as any suitable switching device, such as, for example, a triac or two SCRs. The mechanical air-gap switch $S_{AG}$ is coupled in series with the controllably conductive switching device 312 to provide an actual air-gap break between the AC power source 12 and the lighting load 202 in response to an actuation of the air-gap switch actuator 309. The dimmer switch 300 further comprises a neutral terminal N adapted to coupled to the neutral side of the AC power source 12, and a filter circuit 310, including a resistor $R_F$, a capacitor $C_F$, and an inductor $L_F$, for minimizing the amount of EMI noise at the hot terminal H and the dimmed-hot terminal DH.

A controller 316 is coupled to a control input of the controllably conductive switching device 312 via a gate drive circuit 314 for selectively controlling the controllably conductive switching device 312 to be conductive and non-conductive. Specifically, the controller 316 drives the controllably conductive switching device 312 to render the controllably conductive switching device conductive for a portion of each half-cycle of the AC line voltage of the AC power source 12. As defined herein, "driving" refers to applying a control signal to a gate of a thyristor, such as a triac or a silicon-controller rectifier (SCR), to enable a gate current to flow in the gate of the thyristor, such that the thyristor is conductive. When the thyristor is "conductive", the gate current flows through the gate of the thyristor and the thyristor is operable to conduct a load current. The load current is defined as a current having a magnitude greater than the latching current of the thyristor. If the current through the main load terminals of the thyristor exceeds the latching current of the thyristor (while the thyristor is being driven), the thyristor then conducts the load current and the thyristor is defined to be in "conduction".

The controller 316 may be any suitable controller, such as a microcontroller, a microprocessor, a programmable logic device (PLD), or an application specific integrated circuit (ASIC). The controller 316 receives inputs from the control actuator 302 and the intensity adjustment actuator 304 of the user interface 301, and outputs intensity information to the user interface, such that the visual indicators 308 are operable to display the intensity of the lighting load 202. The controller 316 determines a desired intensity to which to control the lighting load 202 in response to the control actuator 302 and the intensity adjustment actuator 304. When in the screw-in compact fluorescent lamp operating mode, the controller 316 is operable to limit the high-end intensity setting of the dimmer circuit 300, such that the length of the conduction interval $T_{CON}$ does not exceed at least 75% of each half-cycle, and preferably does not exceed 70% of each half-cycle.

The controller 316 is coupled to a memory 318 for storage of the desired intensity of the lighting load 202, the operating mode of the dimmer switch 300, and other information regarding a connected dimmable screw-in compact fluorescent lamp, such as, for example, the manufacturer of the lamp. Alternatively, the memory 318 could be integral to the controller 316. A power supply 320 is coupled between the hot terminal H and the neutral terminal N, such that the power supply does not draw current through the lighting load 202. The power supply 320 generates a direct-current (DC) voltage $V_{CC}$, e.g., 5 $V_{DC}$, for powering the controller 316 and other low-voltage circuitry of the dimmer circuit 300.

A zero-crossing detector 322 is coupled between the hot terminal H and the neutral terminal N for determining the zero-crossing points of the AC source voltage provided by the AC power supply 12. A zero-crossing is defined as the time at which the AC supply voltage transitions from positive to negative polarity, or from negative to positive polarity, at the beginning of each half-cycle. The zero-crossing information is provided as an input to the controller 316. The controller 316 generates the gate control signals to render the controllably conductive switching device 312 conductive and non-conductive at predetermined times relative to the zero-crossing points of the AC source voltage.

Alternatively, if the power supply 320 is able to draw an adequate amount of current through the lighting load 202 to appropriately generate the DC voltage $V_{CC}$ without illuminating the lighting load 202, the filter circuit 310, the power supply 320, and the zero-crossing detector 322 could be coupled across the controllably conductive switching device 312 and the dimmer switch 200 would not require the neutral terminal N for connection to the neutral side of the AC power source 12.

Figure 16:
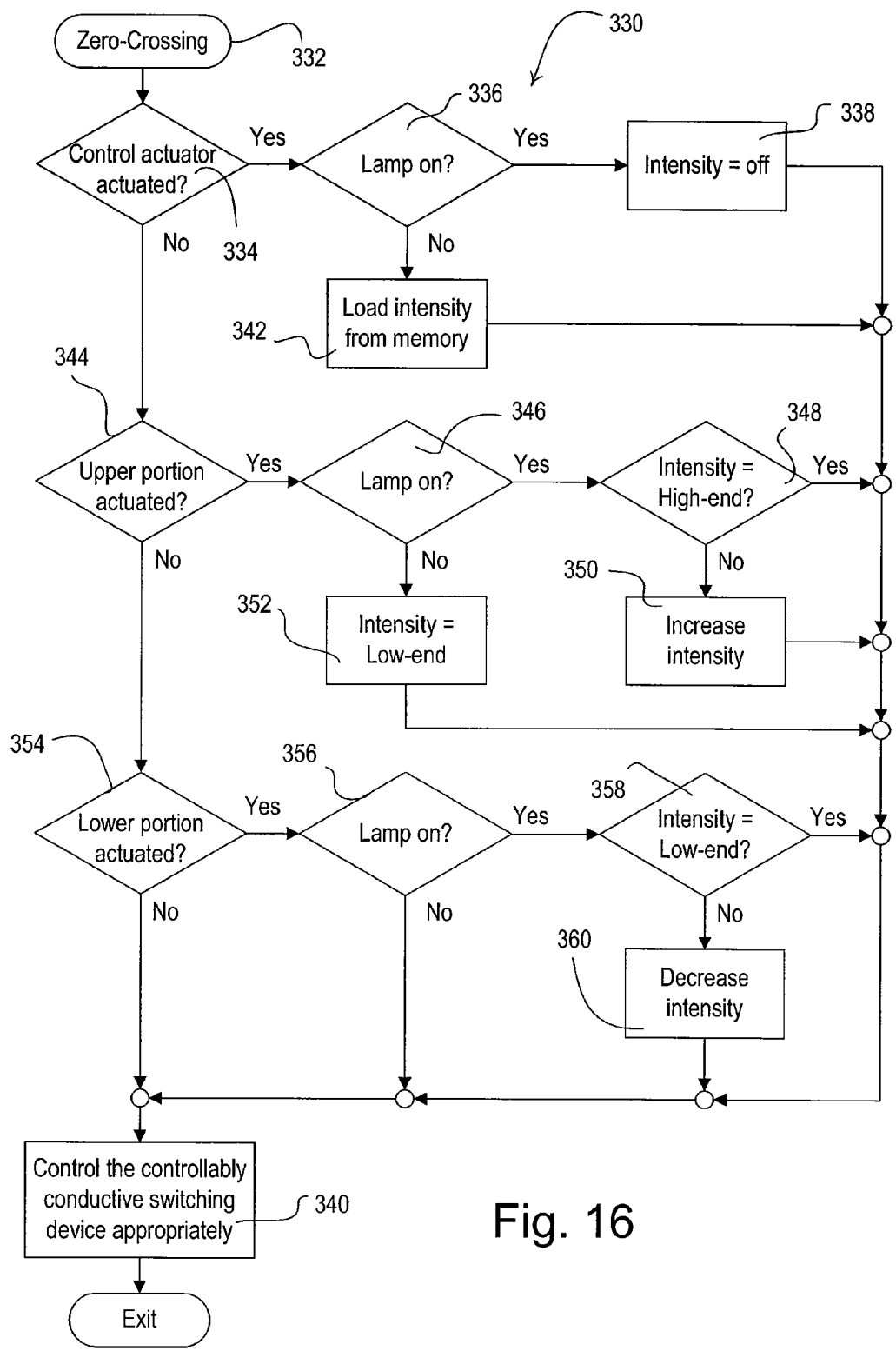
FIG. 16 is a simplified flowchart of a control procedure executed periodically by a controller of the dimmer circuit of FIG. 15.

FIG. 16 is a simplified flowchart of a control procedure 330 executed periodically by the controller 316, e.g., once every half-cycle of the AC power source 12 when the zero-crossing detector 322 detects a zero-crossing at step 332. If the controller 316 determines that the control actuator 302 has been actuated at step 334, a determination is made at step 336 as to whether the lighting load 202 is presently on. If so, the controller 316 stores the light intensity as off (i.e., 0%) in the memory 318 at step 338, and controls the controllably conductive switching device 312 appropriately at step 340 (i.e., does not render the controllably conductive switching device conductive during the present half-cycle). If the lighting load 202 is off at step 336, the controller 316 loads the previously-stored light intensity from the memory 318 at step 342, and controls the controllably conductive switching device to turn on to the appropriate light intensity at step 340 (i.e., renders the controllably conductive switching device conductive at the appropriate time during the present half-cycle).

If the controller 316 determines that the control actuator 302 has not been actuated at step 334, a determination is made as to whether the upper portion 304A of the intensity adjustment actuator 304 has been actuated at step 344. If the upper portion 304A has been actuated at step 344, the lighting load 202 is on at step 346, and the light intensity is not at the high-end intensity setting at step 348, the controller 316 increases the light intensity by a predetermined increment (e.g., 1%) at step 350, and controls the controllably conductive switching device at step 340. If the intensity of the lighting load 202 is at the high-end intensity setting at step 348, the controller 316 does not change the light intensity, such that the light intensity is limited to the high-end intensity setting. If the upper portion 304A is being actuated at step 344 and the lighting load 202 is not on at step 346, the intensity of the lighting load 202 is adjusted to the low-end intensity setting at step 352, and the controllably conductive switching device is controlled appropriately at step 340 (i.e., the lighting load is turned on to the low-end intensity setting).

If the upper portion 304A of the intensity adjustment actuator 304 has not been actuated at step 344, but the lower portion 304B has been actuated at step 354, a determination is made at step 356 as to whether the lighting load 202 is on. If the lighting load 202 is on at step 356 and the light intensity is not at the low-end intensity setting at step 358, the light intensity is decreased by a predetermined increment (e.g., 1%) at step 360. If the light intensity is at the low-end intensity setting at step 358, the controller 316 does not change the light intensity, such that the light intensity remains at the low-end intensity setting. If the lighting load 202 is not on at step 356, the light intensity is not changed (i.e., the lighting load 202 remains off) and the controllably conductive switching device 312 is not rendered conductive at step 340.

If the control actuator 302 has not been actuated at step 334, the upper portion 304A of the intensity adjustment actuator 304 has not been actuated at step 344, and the lower portion 304B of the intensity adjustment actuator has not been actuated at step 354, the controllably conductive switching device is controlled appropriate at step 340. After the controllably conductive switching device is appropriately controlled at step 340 each half-cycle, the control procedure 330 exits. The control procedure 330 is executed by the controller 316 once again at the next zero-crossing of the AC line voltage.

Figure 17:
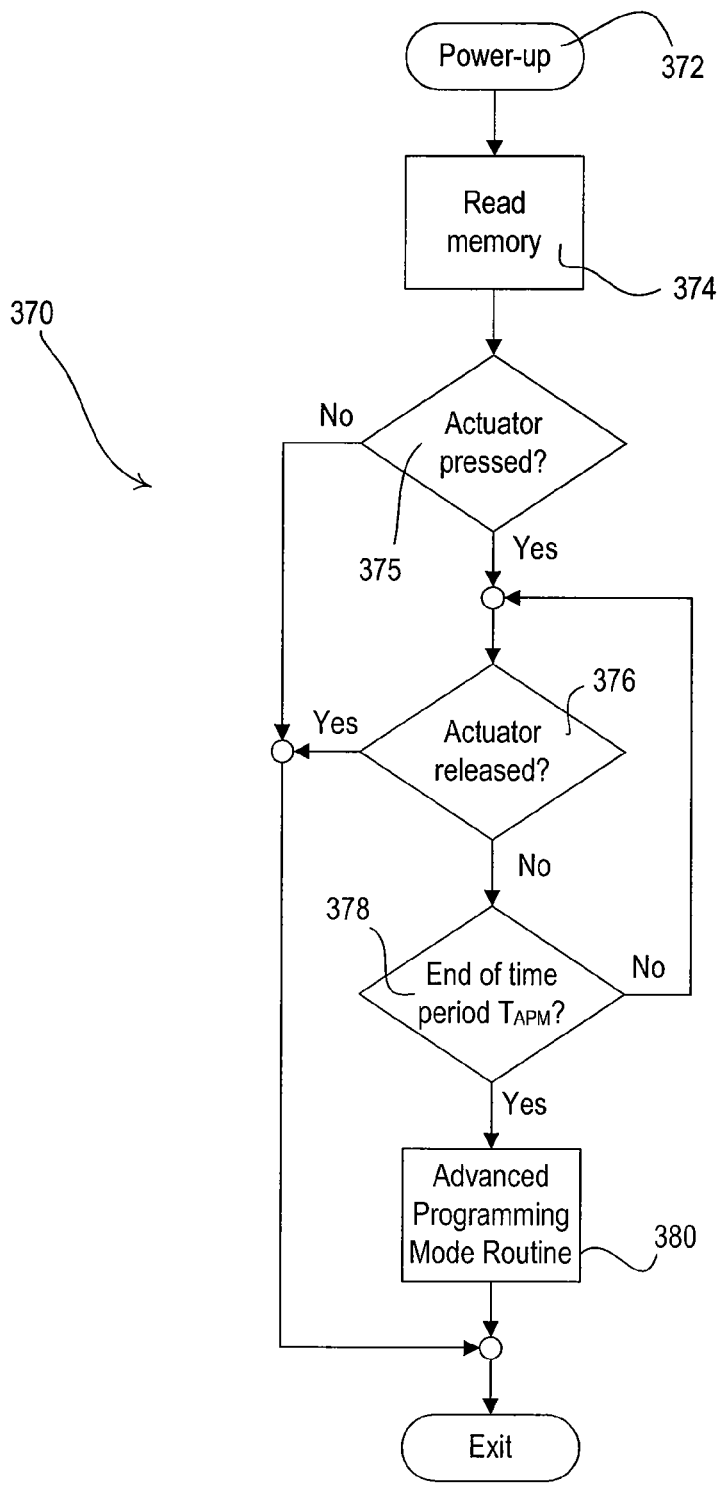
FIG. 17 is a simplified flowchart of a power-up procedure executed by the controller of the dimmer switch of FIG. 15.
Figure 18:
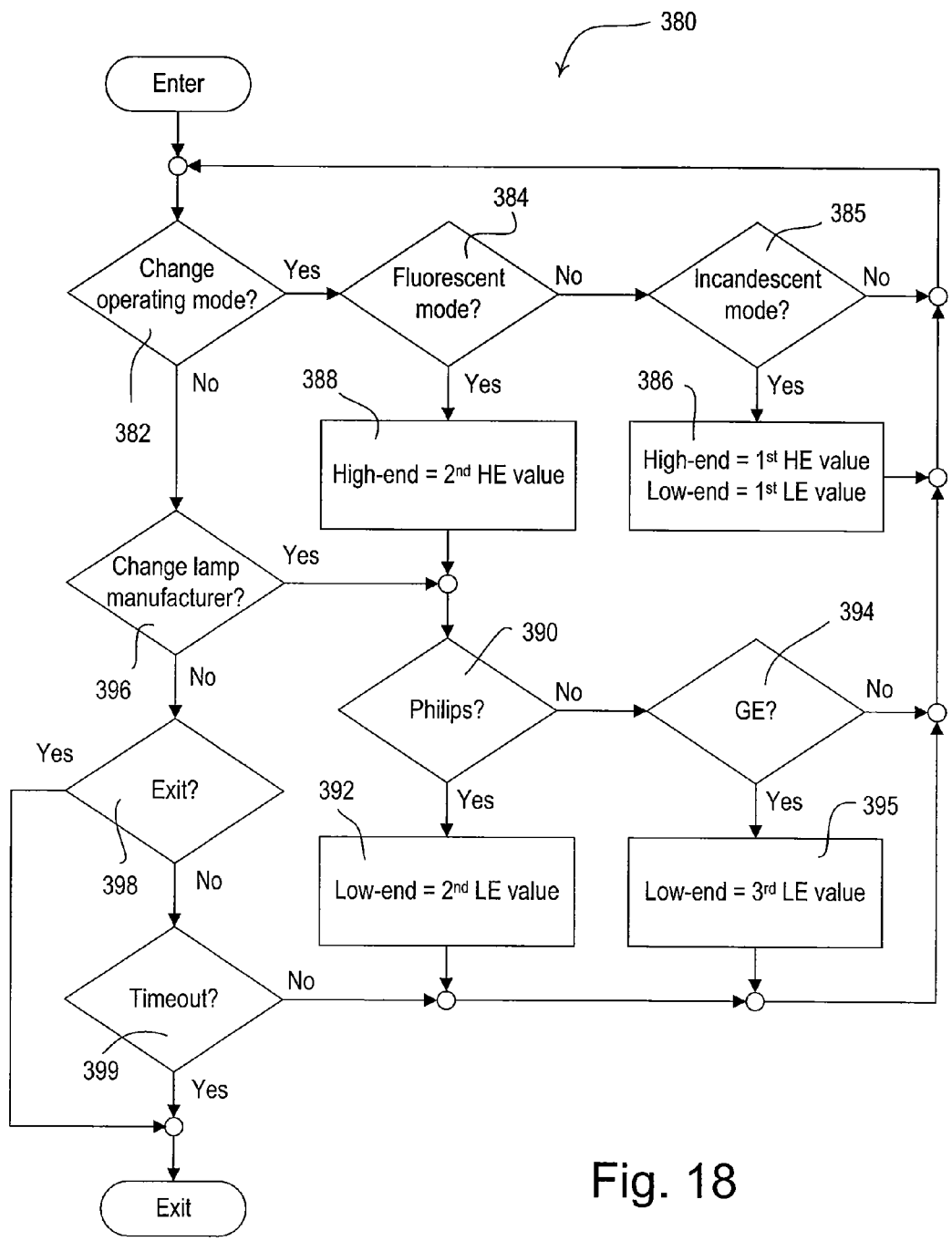
FIG. 18 is a simplified flowchart of an advanced programming mode routine executed by the controller of the dimmer switch of FIG. 15.

FIG. 17 is a simplified flowchart of a power-up procedure 370 that enables the controller 316 to modify the operating mode of the dimmer switch 300 using an advanced programming mode routine 380 (FIG. 18). The power-up procedure 370 is executed by the controller 316 when the controller is first powered up at step 372, for example, in response to the user cycling power to the dimmer switch 300 by actuating the air-gap switch actuator 309. First, the controller 316 reads the memory 318 at step 374 to determine the present intensity of the lighting load 202, the operating mode of the dimmer switch 300, and the manufacturer of a connected dimmable screw-in compact fluorescent lamp. If the control actuator 302 is not being pressed at step 375 when the controller 316 powers up, the power-up procedure 370 simply exits and the dimmer switch 300 enters normal operation.

However, if the control actuator 302 is being pressed at step 375 when the controller 316 powers up, the procedure 370 loops until the control actuator 302 is released at step 376, or a time period $T_{APM}$ (e.g., approximately five seconds since the controller 316 started the power-up procedure 370) expires at step 378. If the control actuator 302 is released at step 376 before the end of the time period $T_{APM}$, the power-up procedure 370 simply exits. On the other hand, if the control actuator 302 is held for the length of the time period $T_{APM}$ at step 378, the controller 316 executes the advanced programming mode routine 380 and then exits to normal operation.

FIG. 18 is a simplified flowchart of the advanced programming mode routine 380. If the user makes a change to the operating mode of the dimmer switch 300 at step 382, a determination is made as to whether the mode is being changed to the screw-in compact fluorescent operating mode at step 384, or to the incandescent operating mode at step 385. If the operating mode is being changed to the incandescent operating mode at step 385, the controller 316 adjusts the high-end intensity setting to a first high-end (HE) intensity value (e.g., the off time $T_{OFF}$ of the controllably conductive switching device 312 is approximately 1.4 msec) and adjusts the low-end intensity setting to a first low-end (LE) intensity value (e.g., the off time $T_{OFF}$ of the controllably conductive switching device 312 is approximately 6.8 msec) at step 386.

If the operating mode is being changed to the screw-in fluorescent operating mode at step 384, the controller 316 adjusts the high-end intensity setting to a second high-end intensity setting value (e.g., the off time $T_{OFF}$ of the controllably conductive switching device 312 is approximately 2.5 msec) at step 388, and then determines the manufacturer of the connected dimmable screw-in compact fluorescent lamp (as stored in the memory 318) in order to adjust the low-end intensity setting to the appropriate intensity value. Specifically, if the fluorescent lamp is a Philips® dimmable screw-in compact fluorescent lamp at step 390, the controller 316 adjusts the low-end intensity setting to a second low-end intensity setting value (e.g., the off time $T_{OFF}$ of the controllably conductive switching device 312 is approximately 5.6 msec) at step 392. Alternatively, if the controller 316 determines at step 394 that the dimmable screw-in compact fluorescent lamp is manufactured by General Electric (GE), the controller adjusts the low-end intensity setting to a third low-end intensity setting value (e.g., the off time $T_{OFF}$ of the controllably conductive switching device 312 is approximately 6.2 msec) at step 395. Additionally, the controller 316 could allow the user to select from other manufacturers of dimmable screw-in compact fluorescent lamps.

If the user is not changing the operating mode of the dimmer switch 300 at step 382, but the user is changing the manufacturer of the screw-in compact fluorescent lamp at step 396, the controller 316 adjusts the low-end intensity setting of the dimmer switch at steps 392 and 395 in response to the manufacturer determined at steps 390 and 394, respectively. If the user chooses to exit the advanced programming mode at step 398, or if a timeout (e.g., five seconds since the last actuation of either of the control actuator 302 and the intensity adjustment actuator 304) expires at step 399, the advanced programming mode routine 380 exits. Otherwise, the advanced programming mode routine 380 loops to allow the user to change the operating mode or the manufacturer of the connected dimmable screw-in compact fluorescent lamp once again.

Figure 19:
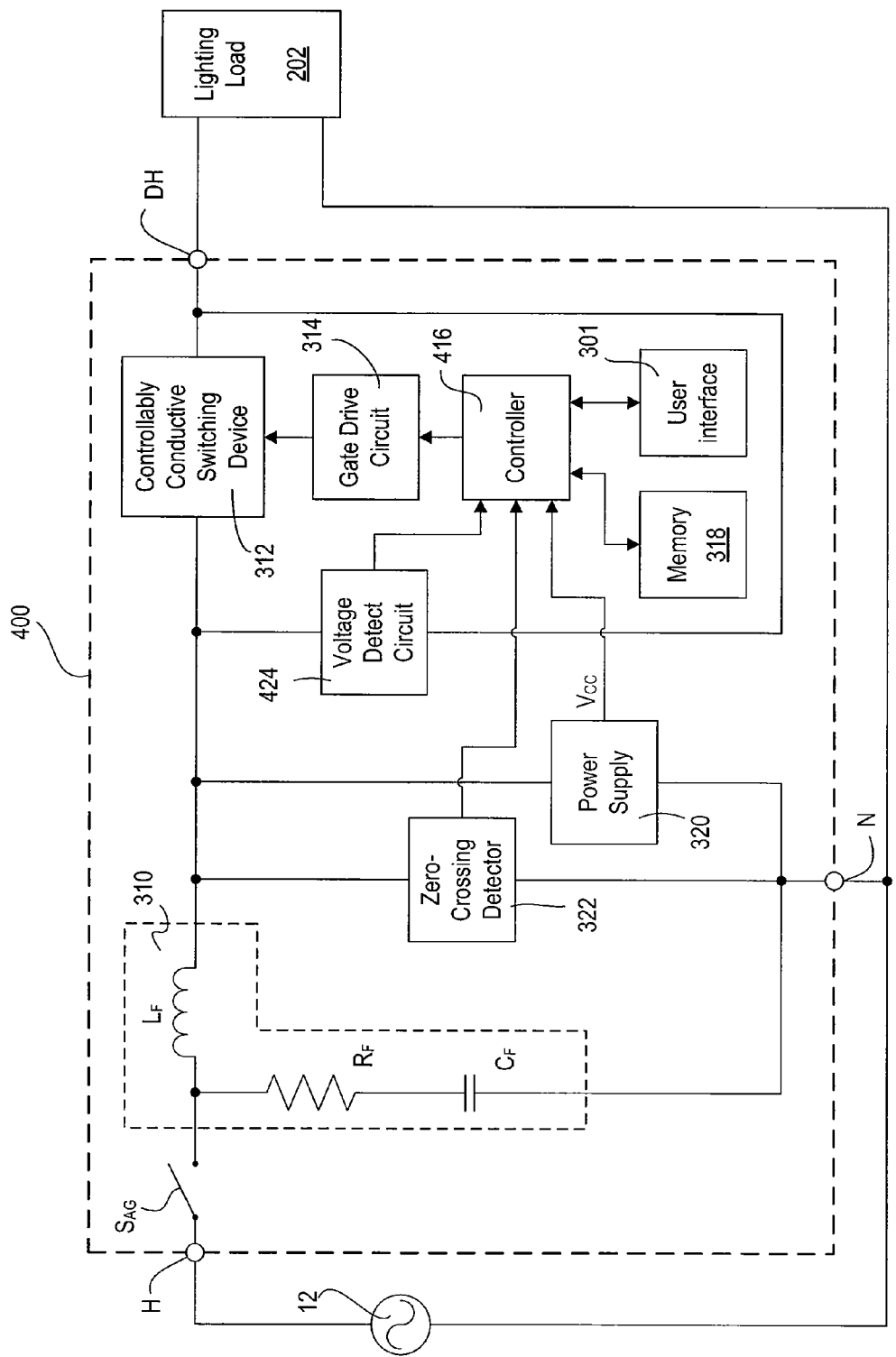
FIG. 19 is a simplified block diagram of a smart dimmer switch according to a fourth embodiment of the present invention.

FIG. 19 is a simplified block diagram of a smart dimmer switch 400 according to a fourth embodiment of the present invention. The smart dimmer 400 is operable to automatically determine the type of lamp (e.g., an incandescent lamp or a dimmable screw-in compact fluorescent lamp) is coupled to the dimmer switch, and to accordingly change between the incandescent operating mode and the screw-in compact fluorescent operating mode. Preferably, the controllably conductive switching device 312 comprises a triac, and a controller 416 is operable to detect the occurrence of multiple firings of the triac (as shown in FIG. 6) to determine that a dimmable screw-in compact fluorescent lamp is connected to the dimmer switch 400. Specifically, upon first powering up, the controller 416 is operable to render the triac conductive after the power supply charging time $T_{CHG}$ following the next zero-crossing of the AC line voltage. The controller 416 is operable to determine whether the triac latches and becomes conductive in response to the voltage sensed across the triac by the voltage detect circuit 424.

The dimmer switch 400 comprises a voltage detect circuit 424 (i.e., a sensing circuit) that is coupled across the controllably conductive switching device 312 and provides a control signal representative of the magnitude of the voltage across the controllably conductive switching device to the controller 416. Preferably, the voltage detect circuit 424 simply compares the voltage across the triac to a predetermined voltage threshold (e.g., approximately 2 volts). If the voltage across the triac is less than the predetermined voltage threshold, the triac has latched and is conducting the load current to the lighting load 202. This indicates that the lighting load 202 is an incandescent lamp. At this time, the voltage detect circuit 424 preferably provides the control signal at a logic high level (e.g., approximately the DC voltage generated by the power supply 320, i.e., 5 $V_{DC}$). When the voltage across the triac is greater than the predetermined voltage threshold, the triac has not latched, and the triac is non-conductive. This indicates that the lighting load 202 is a dimmable screw-in compact fluorescent lamp. Accordingly, the voltage detect circuit 424 preferably drives the control signal to a logic low level (e.g., approximately circuit common).

The dimmer switch 400 of the present invention is not limited to comprising a voltage detect circuit coupled across the controllably conductive switching device 312 for determining whether the controllably conductive switching device is conducting the load current. Alternatively, the voltage detect circuit 424 may comprise any type of sensing circuit capable of sensing an electrical characteristic of the load terminal connected to the lighting load 202 (i.e., the dimmed-hot terminal DH), wherein the electrical characteristic is representative of the type of lighting load connected to the dimmer switch 400. For example, the electrical characteristic may comprise the load current or the voltage of at the dimmed-hot terminal DH (referenced to the hot terminal H).

Figure 20:
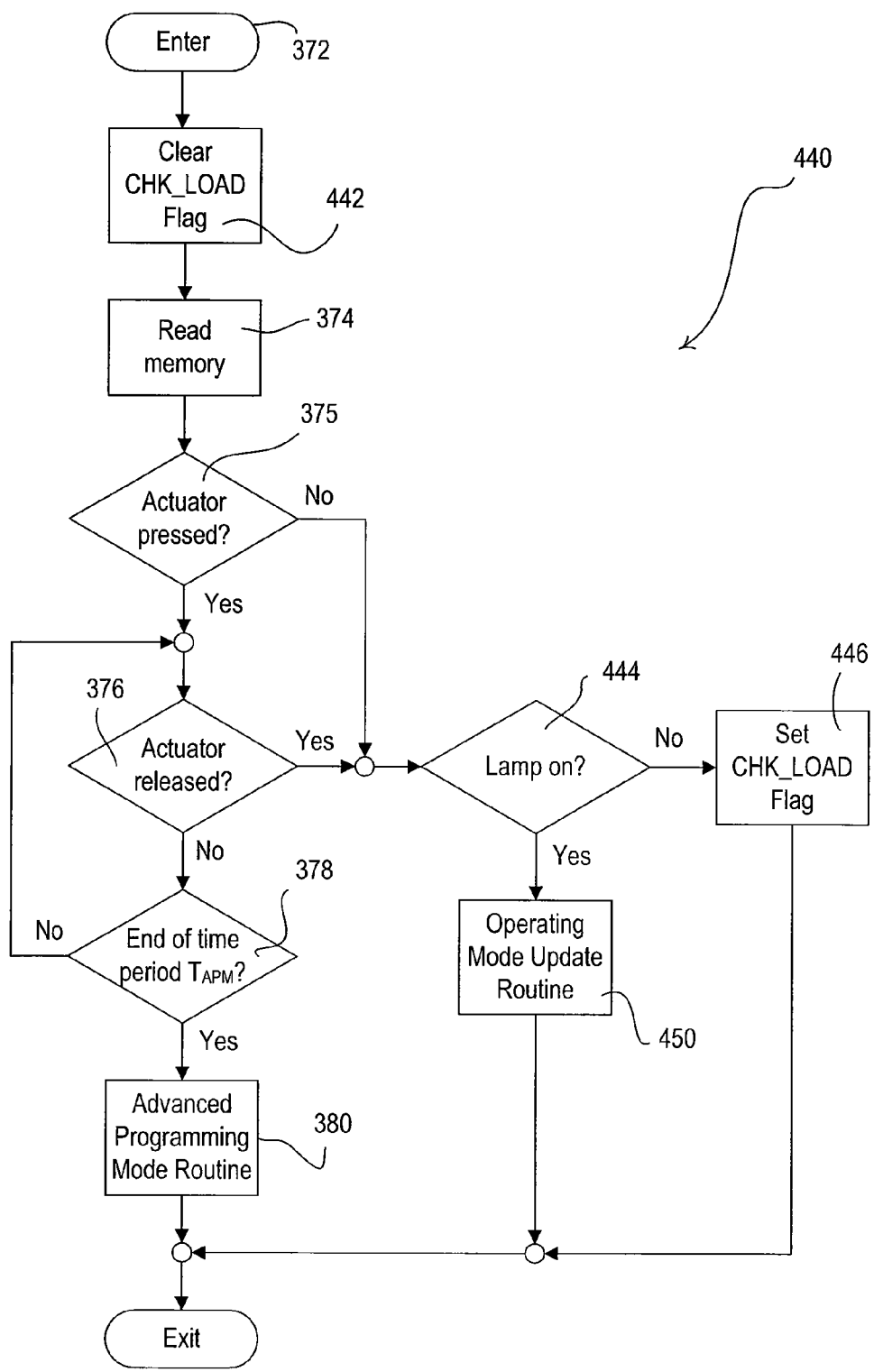
FIG. 20 is a simplified flowchart of a power-up procedure executed by a controller of the dimmer switch of FIG. 19.

FIG. 20 is a simplified flowchart of a power-up procedure 440 executed by the controller 416 of the dimmer switch 400. The power-up procedure 440 allows for manual adjustment of the operating mode of the dimmer switch 400, but also provides for automatic adjustment of the operating mode. Specifically, if the lighting load 202 should be on when the controller 416 is powered up (as determined from the memory 318), the controller 416 monitors the voltage across the controllably conductive switching device 312 and adjusts the operating mode during the power-up procedure 440. However, if the lighting load 202 should be off when the controller 416 is powered up, the controller waits until the lamp is next turned on to adjust the operating mode. The controller 416 uses a flag CHK_LOAD to signal that the operating mode should be adjusted (if needed) when the lighting load 202 is next turned on. The flag CHK_LOAD is cleared at step 442 at the beginning of the power-up procedure 440.

If the control actuator 302 is pressed at step 375 when the controller 416 first powers up at step 372, but is not released at step 376 before the end of the time period $T_{APM}$ at step 378, the controller 416 executes the advanced programming mode procedure 380 to allow the user to manually change the operating mode of the dimmer switch 400 and the manufacturer of a connected dimmable screw-in compact fluorescent lamp (as was described with reference to FIG. 18).

However, if the control actuator 302 is not pressed at step 375 or the actuator is released before the end of the time period $T_{APM}$ at step 378, a determination is made at step 444 as to whether the lighting load 202 is on. If so, the controller 416 executes an operating mode update routine 450 (FIG. 21) to automatically detect the type of lamp connected to the dimmer switch 400. If the lighting load 202 is not on at step 444, the flag CHK_LOAD is set at step 446, such that the controller 416 will execute the operating mode update routine 450 the next time the lighting load 202 is turned on.

Figure 21:
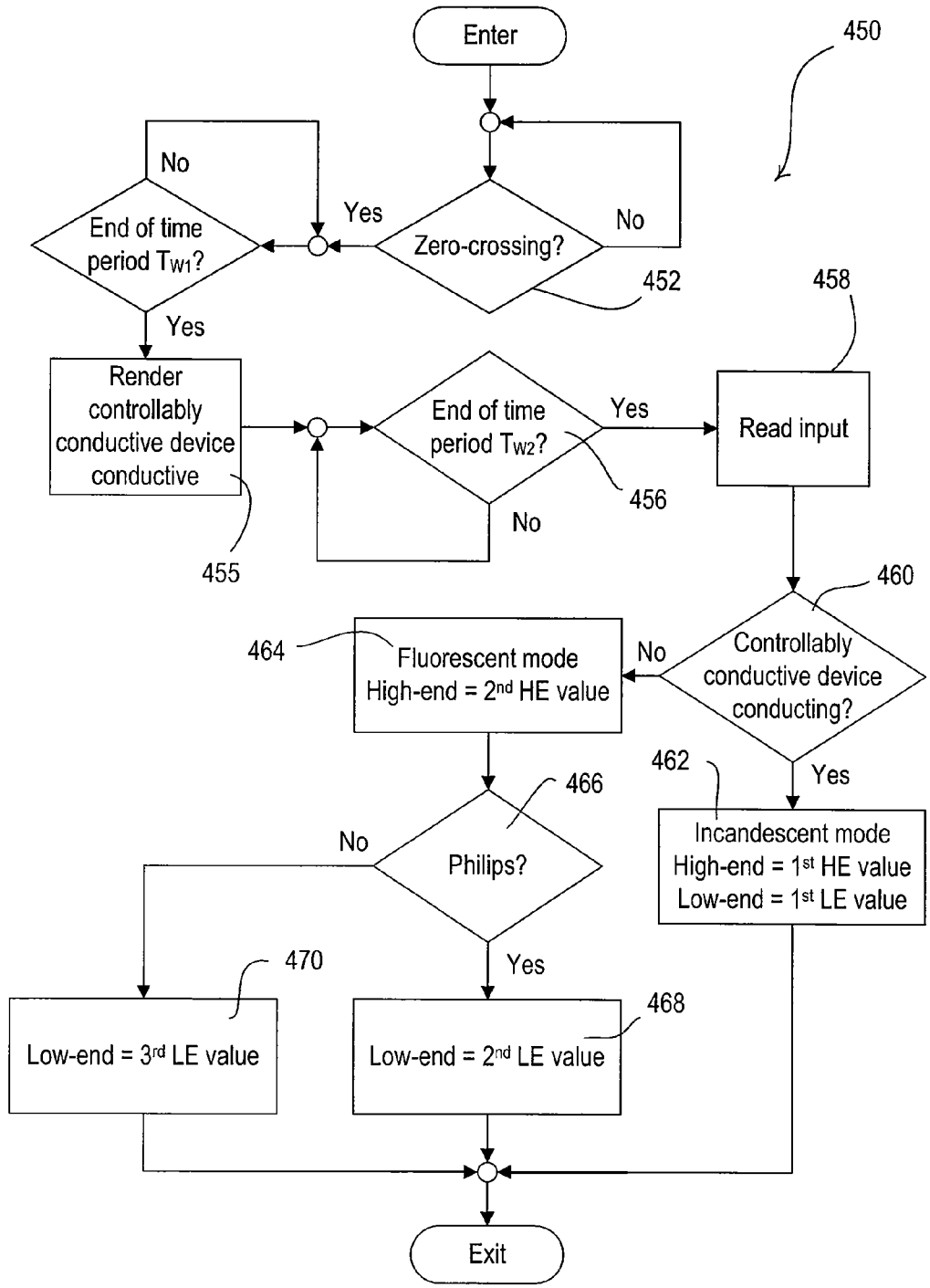
FIG. 21 is a simplified flowchart of an operating mode update routine executed by the controller of the dimmer switch of FIG. 19 to automatically detect the type of lamp connected to the dimmer switch.

FIG. 21 is a simplified flowchart of the operating mode update routine 450 executed by the controller 416 to automatically detect the type of lamp connected to the dimmer switch 400. First, the controller 416 waits for the next zero-crossing at step 452 and then waits for a first time period $T_{W1}$ at step 454, before rendering the controllably conductive switching device 312 conductive at step 455. Next, the controller 416 waits at step 456 for a second time period $T_{W2}$, i.e., an appropriate amount of time for the controllably conductive switching device 312 to latch (e.g., 400 μsec after rendering the controllably conductive switching device conductive). At the end of the time period $T_{W2}$ at step 458, the controller 416 reads the input provided by the voltage detect circuit 424. If the control signal provided by the voltage detect circuit 424 signals that the voltage across the controllably conductive switching device 312 is less than the predetermined voltage threshold at step 460 (i.e., the controllably conductive has latched and is conducting the load current to the lighting load 202), the controller 416 determines that the lighting load 202 is not a dimmable screw-in compact fluorescent lamp. Accordingly, the controller 416 adjusts the operating mode of the dimmer switch 400 to the incandescent operating mode by adjusting the high-end intensity setting to the first high-end intensity setting value and the low-end intensity setting to the first low-end intensity setting value at step 462.

If the control signal from the voltage detect circuit 424 indicates that the voltage across the controllably conductive switching device 312 is greater than the predetermined voltage threshold at step 460 (i.e., the controllably conductive has not latched), the controller 416 determines that the lighting load 202 is a dimmable screw-in compact fluorescent lamp, changes to the fluorescent operating mode, and adjusts the high-end intensity setting to the second high-end intensity setting value at step 464. If the manufacturer of the lamp (as stored in the memory 318) is Philips at step 466, the low-end intensity setting is adjusted to the second low-end intensity setting value at step 468. Otherwise, the low-end intensity setting is adjusted to the third low-end intensity setting value at step 470. The user of the dimmer 400 may also use the advanced programming mode to change the manufacturer of the fluorescent lamp (as shown in FIG. 18).

Figure 22:
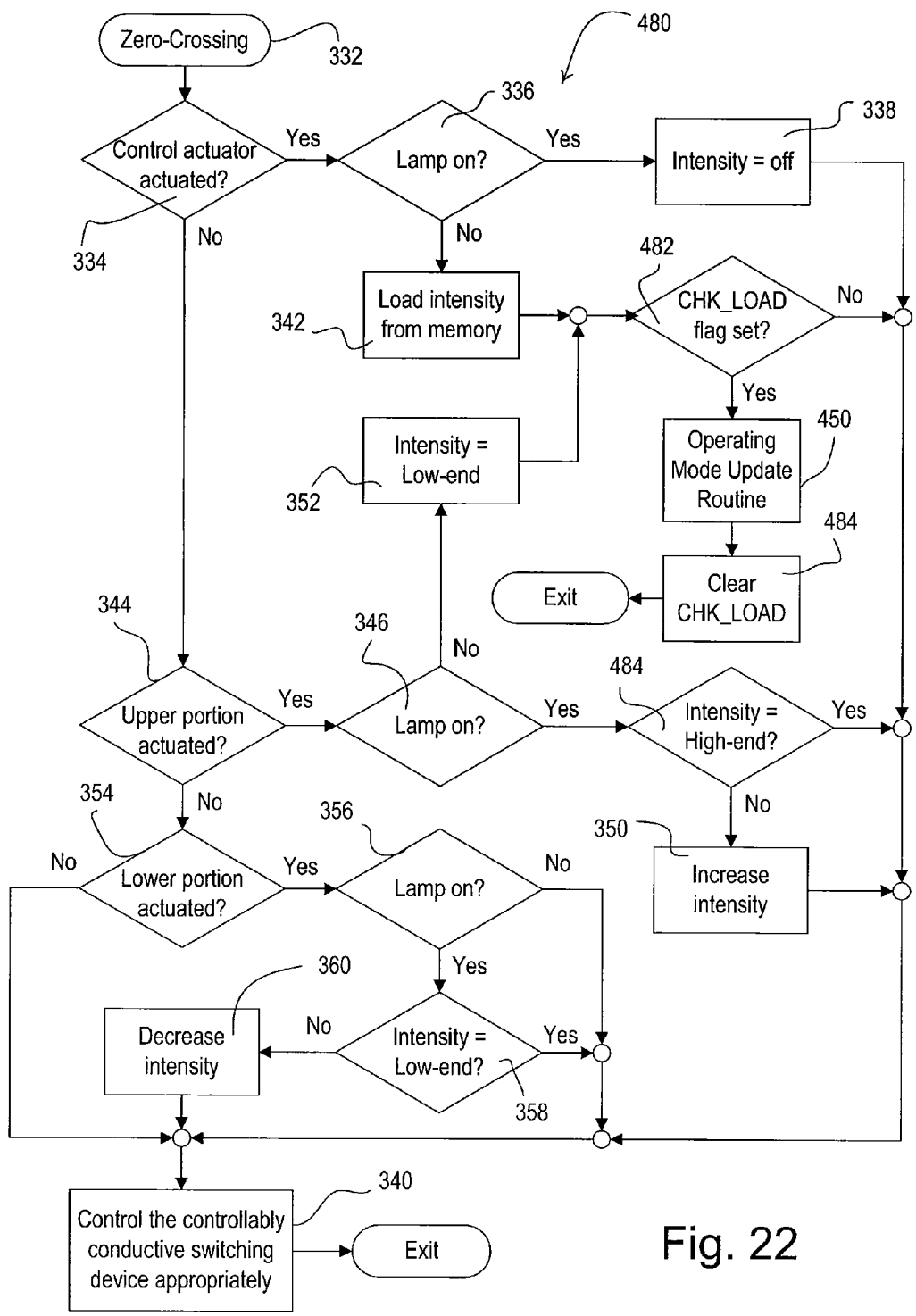
FIG. 22 is a simplified flowchart of a control procedure executed periodically by the controller of the dimmer switch of FIG. 19.

FIG. 22 is a simplified flowchart of a control procedure 480 executed by the controller 416 periodically, e.g., once every half-cycle of the AC power source 12 in response to a zero-crossing of the AC line voltage at step 332. The controller procedure 480 is very similar to the control procedure 330 of FIG. 16. However, after controlling the lighting load 202 from off to on (i.e., at steps 342 and 352), the controller 416 determines whether the flag CHK_LOAD is set at step 482. If not, the control procedure 480 continues as normal to appropriately control the controllably conductive switching device at step 340. However, if the flag CHK_LOAD is set at step 482, the controller 416 executes the operating mode update routine 450 (FIG. 21) to automatically detect the type of lighting load connected to the dimmer switch 400. The flag CHK_LOAD is then cleared at step 484, and the control procedure 480 exits.

Alternatively, the controller 416 could execute the operating mode update routine 450 for multiple consecutive half-cycles, and adjust the operating mode of the dimmer switch 400 based on the data produced from all of the multiple half-cycles.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dimmer switch adapted to be coupled between an AC power source and a lighting load for controlling the intensity of the lighting load between a high-end intensity setting and a low-end intensity setting, the dimmer switch comprising:
   a user-accessible adjustment actuator for changing the dimmer switch between first and second operating modes, wherein the first operating mode is provided to operate a first type of lighting load and the second operating mode is provided to operate a second type of lighting load including a ballast having a full-wave rectifier bridge having AC input terminals and DC terminals coupled to a bus capacitor, such that the low-end intensity setting is adjusted to a first low-end intensity setting value in the first operating mode, and the low-end intensity setting is adjusted to a second low-end intensity setting value greater than the first low-end intensity setting value in the second operating mode;
   wherein the dimmer switch is disposed in a housing that is adapted to be mounted by a mounting yoke in an electrical wallbox behind a faceplate, and wherein the user-accessible adjustment actuator is accessible when the dimmer switch is at least partially mounted in the electrical wallbox; the dimmer switch further comprising:
   a controllably conductive switching device adapted to be coupled in series electrical connection between the AC power source and the lighting load, the controllably conductive switching device having a control input for controlling the controllably conductive switching device between an off-state and an on-state;
   a trigger circuit coupled to the control input of the controllably conductive switching device for rendering the controllably conductive switching device conductive each half-cycle of the AC power source; and
   a timing circuit operatively coupled in parallel electrical connection with the controllably conductive switching device for generating a timing voltage, the trigger circuit operable to control the controllably conductive switching device in response to the timing voltage to generate a dimmed hot voltage, the timing circuit comprising:
   a potentiometer for providing a variable resistance to thereby control the duration of the on-state of the controllably conductive switching device and thus the dimmed hot voltage; and
   a firing capacitor coupled to the output of the timing circuit for generating the timing voltage, the firing capacitor adapted to charge through the potentiometer;
   the trigger circuit triggering at a predefined timing voltage to render the controllably conductive switching device conductive;
   wherein in the first operating mode, a first impedance is coupled in parallel with the potentiometer, and in the second operating mode, a second impedance less than the first impedance is coupled in parallel with the potentiometer thereby to allow said firing capacitor to charge to the predefined timing voltage more rapidly in the second operating mode than in the first operating mode;
   wherein actuation of the user-accessible adjustment actuator controls whether the first impedance or the second impedance is coupled in parallel with the potentiometer; and
   wherein, when the low-end intensity setting is adjusted to the second low-end intensity setting value in the second operating mode, the dimmer switch is adapted to control the lighting intensity of the second type of lighting load comprising a full-wave rectifier bridge having AC input terminals for receiving the dimmed hot voltage and DC terminals coupled to a bus capacitor.

2. The dimmer switch of claim 1, further comprising:
   a voltage compensation circuit coupled in series electrical connection with the timing circuit, such that the series combination of the timing circuit and the voltage compensation circuit are coupled in parallel electrical connection with the controllably conductive switching device, the voltage compensation circuit operable to compensate for voltage fluctuations of the AC power source.

3. The dimmer switch of claim 1, wherein the user-accessible adjustment actuator comprises a mechanical switch that couples the first impedance across the potentiometer in the first operating mode and the second impedance across the potentiometer in the second operating mode.

4. The dimmer switch of claim 1, further comprising:
   an intensity adjustment actuator mechanically coupled to the potentiometer, such that the variable resistance of the potentiometer is responsive to the intensity adjustment actuator.

5. The dimmer switch of claim 1, wherein the controllably conductive switching device comprises a triac.

6. The dimmer switch of claim 5, wherein the triac is characterized by a low holding current of less than approximately 35 mA.

7. The dimmer switch of claim 1, wherein the first operating mode is characterized by a first dynamic range and the second operating mode is characterized by a second dynamic range, wherein the second dynamic range is less than the first dynamic range.

8. The dimmer switch of claim 1, wherein the second operating mode is adapted to operate a screw-in compact fluorescent lamp.

9. The dimmer switch of claim 1, wherein the first operating mode is adapted to operate an incandescent lamp.

10. The dimmer switch of claim 1, wherein the first and second operating modes comprise an incandescent operating mode and a screw-in compact fluorescent lamp operating mode, respectively.

11. The dimmer switch of claim 1, wherein the dimmer switch comprises a two-wire device having a hot terminal and a dimmed hot terminal but lacks a terminal for connection to the AC power source neutral line.

12. The dimmer switch of claim 1, wherein the dimmer switch lacks a terminal for connection to the AC power source neutral line.

13. The dimmer switch of claim 1, wherein the second operating mode has a high-end intensity setting value that is higher than a high-end intensity setting value in the first operating mode.

14. A dimmer switch adapted to be coupled between an AC power source and a lighting load for controlling the intensity of the lighting load between a high-end intensity setting and a low-end intensity setting, the dimmer switch comprising:
a user-accessible adjustment actuator for changing the dimmer switch between first and second operating modes, wherein the first operating mode is provided to operate a first type of lighting load and the second operating mode is provided to operate a second type of lighting load including a ballast having a full-wave rectifier bridge having AC input terminals and DC terminals coupled to a bus capacitor, such that the low-end intensity setting is adjusted to a first low-end intensity setting value in the first operating mode, and the low-end intensity setting is adjusted to a second low-end intensity setting value greater than the first low-end intensity setting value in the second operating mode;
wherein the dimmer switch is disposed in a housing that is adapted to be mounted by a mounting yoke in an electrical wallbox behind a faceplate, and wherein the user-accessible adjustment actuator is accessed with the faceplate removed; the dimmer switch further comprising:
a controllably conductive switching device adapted to be coupled in series electrical connection between the AC power source and the lighting load, the controllably conductive switching device having a control input for controlling the controllably conductive switching device between an off-state and an on-state;
a trigger circuit coupled to the control input of the controllably conductive switching device for rendering the controllably conductive switching device conductive each half-cycle of the AC power source; and
a timing circuit operatively coupled in parallel electrical connection with the controllably conductive switching device for generating a timing voltage, the trigger circuit operable to control the controllably conductive switching device in response to the timing voltage to generate a dimmed hot voltage, the timing circuit comprising:
a potentiometer for providing a variable resistance to thereby control the duration of the on-state of the controllably conductive switching device and thus the dimmed hot voltage; and
a firing capacitor at the output of the timing circuit for generating the timing voltage, the firing capacitor adapted to charge through the potentiometer;
the trigger circuit triggering at a predefined timing voltage to render the controllably conductive switching device conductive;
wherein in the first operating mode, a first impedance is coupled in parallel with the potentiometer, and in the second operating mode, a second impedance less than the first impedance is coupled in parallel with the potentiometer thereby to allow said firing capacitor to charge to the predefined timing voltage more rapidly in the second operating mode than in the first operating mode;
wherein actuation of the user-accessible adjustment actuator controls whether the first impedance or the second impedance is coupled in parallel with the potentiometer; and
wherein, when the low-end intensity setting is adjusted to the second low-end intensity setting value in the second operating mode, the dimmer switch is adapted to control the lighting intensity of the second type of lighting load comprising a full-wave rectifier bridge having AC input terminals for receiving the dimmed hot voltage and DC terminals coupled to a bus capacitor; the dimmer switch further comprising:
a voltage compensation circuit coupled in series electrical connection with the timing circuit, such that the series combination of the timing circuit and the voltage compensation circuit are coupled in parallel electrical connection with the controllably conductive switching device, the voltage compensation circuit operable to compensate for voltage fluctuations of the AC power source.

15. The dimmer switch of claim 14, wherein the user-accessible adjustment actuator comprises a mechanical switch that couples the first impedance across the potentiometer in the first operating mode and the second impedance across the potentiometer in the second operating mode.

16. The dimmer switch of claim 14, further comprising:
an intensity adjustment actuator mechanically coupled to the potentiometer, such that the variable resistance of the potentiometer is responsive to the intensity adjustment actuator.

17. The dimmer switch of claim 14, wherein the controllably conductive switching device comprises a triac.

18. The dimmer switch of claim 17, wherein the triac is characterized by a low holding current of less than approximately 35 mA.

19. The dimmer switch of claim 14, wherein the first operating mode is characterized by a first dynamic range and the second operating mode is characterized by a second dynamic range, wherein the second dynamic range is less than the first dynamic range.

20. The dimmer switch of claim 14, wherein the second operating mode is adapted to operate a screw-in compact fluorescent lamp.

21. The dimmer switch of claim 14, wherein the first operating mode is adapted to operate an incandescent lamp.

22. The dimmer switch of claim 14, wherein the first and second operating modes comprise an incandescent lamp operating mode and a screw-in compact fluorescent operating mode, respectively.

23. The dimmer switch of claim 14, wherein the dimmer switch comprises a two-wire device having a hot terminal and a dimmed hot terminal but lacks a terminal for connection to the AC power source neutral line.

24. The dimmer switch of claim 14, wherein the dimmer switch lacks a terminal for connection to the AC power source neutral line.

25. The dimmer switch of claim 14, wherein the second operating mode has a high-end intensity setting value that is higher than a high-end intensity setting value in the first operating mode.

26. A dimmer switch adapted to be coupled between an AC power source and a lighting load for controlling the intensity of the lighting load between a high-end intensity setting and a low-end intensity setting, the dimmer switch comprising:
a user-accessible adjustment actuator for changing the dimmer switch between first and second operating modes, wherein the first operating mode is provided to operate a first type of lighting load and the second operating mode is provided to operate a second type of lighting load including a ballast having a full-wave rectifier bridge having AC input terminals and DC terminals coupled to a bus capacitor, such that the low-end intensity setting is adjusted to a first low-end intensity setting value in the first operating mode, and the low-end intensity setting is adjusted to a second low-end intensity setting value greater than the first low-end intensity setting value in the second operating mode;
wherein the dimmer switch is disposed in a housing that is adapted to be mounted by a mounting yoke in an electrical wallbox behind a faceplate, and wherein the user-accessible adjustment actuator is accessed with the faceplate removed; the dimmer switch further comprising:
a controllably conductive switching device adapted to be coupled in series electrical connection between the AC power source and the lighting load, the controllably conductive switching device having a control input for controlling the controllably conductive switching device between an off-state and an on-state;
a trigger circuit coupled to the control input of the controllably conductive switching device for rendering the controllably conductive switching device conductive each half-cycle of the AC power source; and
a timing circuit operatively coupled in parallel electrical connection with the controllably conductive switching device for generating a timing voltage, the trigger circuit operable to control the controllably conductive switching device in response to the timing voltage to generate a dimmed hot voltage, the timing circuit comprising:
a potentiometer for providing a variable resistance to thereby control the duration of the on-state of the controllably conductive switching device and thus the dimmed hot voltage; and
a firing capacitor at to the output of the timing circuit for generating the timing voltage, the firing capacitor adapted to charge through the potentiometer;
the trigger circuit triggering at a predefined timing voltage to render the controllably conductive switching device conductive;
wherein in the first operating mode, a first impedance is coupled in parallel with the potentiometer, and in the second operating mode, a second impedance less than the first impedance is coupled in parallel with the potentiometer thereby to allow said firing capacitor to charge to the predefined timing voltage more rapidly in the second operating mode than in the first operating mode;
wherein actuations of the user-accessible adjustment actuator control whether the first impedance or the second impedance is coupled in parallel with the potentiometer; and
wherein, when the low-end intensity setting is adjusted to the second low-end intensity setting value in the second operating mode, the dimmer switch is adapted to control the lighting intensity of the second type of lighting load comprising a full-wave rectifier bridge having AC input terminals for receiving the dimmed hot voltage and DC terminals coupled to a bus capacitor;
further wherein the controllably conductive switching device comprises a triac; and
wherein the triac is characterized by a low holding current of less than approximately 35 mA.

27. The dimmer switch of claim 26, further comprising:
a voltage compensation circuit coupled in series electrical connection with the timing circuit, such that the series combination of the timing circuit and the voltage compensation circuit are coupled in parallel electrical connection with the triac, the voltage compensation circuit operable to compensate for voltage fluctuations of the AC power source.

28. The dimmer switch of claim 26, wherein the user-accessible adjustment actuator comprises a mechanical switch that couples the first impedance across the potentiometer in the first operating mode and the second impedance across the potentiometer in the second operating mode.

29. The dimmer switch of claim 26, further comprising:
an intensity adjustment actuator mechanically coupled to the potentiometer, such that the variable resistance of the potentiometer is responsive to the intensity adjustment actuator.

30. The dimmer switch of claim 26, wherein the triac is characterized by a holding current of approximately 15 mA.

31. The dimmer switch of claim 26, wherein the first operating mode is characterized by a first dynamic range and the second operating mode is characterized by a second dynamic range, wherein the second dynamic range is less than the first dynamic range.

32. The dimmer switch of claim 26, wherein the second operating mode is adapted to operate a screw-in compact fluorescent lamp.

33. The dimmer switch of claim 26, wherein the first operating mode is adapted to operate an incandescent lamp.

34. The dimmer switch of claim 26, wherein the first and second operating modes comprise an incandescent operating mode and a screw-in compact fluorescent lamp operating mode, respectively.

35. The dimmer switch of claim 26, wherein the dimmer switch comprises a two-wire device having a hot terminal and a dimmed hot terminal but lacks a terminal for connection to the AC power source neutral line.

36. The dimmer switch of claim 26, wherein the dimmer switch lacks a terminal for connection to the AC power source neutral line.

37. The dimmer switch of claim 26, wherein the second operating mode has a high-end intensity setting value that is higher than a high-end intensity setting value in the first operating mode.

* * * * *